United States Patent
Ye et al.

(10) Patent No.: US 12,082,158 B2
(45) Date of Patent: Sep. 3, 2024

(54) SIDELINK WAKE-UP SIGNAL FOR A WIRELESS DEVICE

(71) Applicant: Apple Inc., Cupertino, CA (US)

(72) Inventors: Chunxuan Ye, San Diego, CA (US); Yushu Zhang, Beijing (CN); Dawei Zhang, Saratoga, CA (US); Haijing Hu, Los Gatos, CA (US); Haitong Sun, Cupertino, CA (US); Hong He, San Jose, CA (US); Huaning Niu, San Jose, CA (US); Jie Cui, San Jose, CA (US); Manasa Raghavan, Sunnyvale, CA (US); Oghenekome Oteri, San Diego, CA (US); Sigen Ye, Whitehouse Station, NJ (US); Wei Zeng, Saratoga, CA (US); Weidong Yang, San Diego, CA (US); Yang Tang, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,834

(22) PCT Filed: Oct. 15, 2020

(86) PCT No.: PCT/CN2020/121057
§ 371 (c)(1),
(2) Date: Sep. 24, 2021

(87) PCT Pub. No.: WO2022/077312
PCT Pub. Date: Apr. 21, 2022

(65) Prior Publication Data
US 2023/0239837 A1     Jul. 27, 2023

(51) Int. Cl.
*H04W 72/02*     (2009.01)
*H04W 76/28*     (2018.01)

(52) U.S. Cl.
CPC ............ *H04W 72/02* (2013.01); *H04W 76/28* (2018.02)

(58) Field of Classification Search
CPC . H04W 64/003; H04W 76/28; H04W 76/005; H04W 68/005; H04W 68/02;
(Continued)

(56) References Cited

U.S. PATENT DOCUMENTS 9,749,986 B2 *    8/2017  Su ..................... H04W 68/005
10,264,545 B2 *   4/2019  Su ....................... H04W 68/02
(Continued)

FOREIGN PATENT DOCUMENTS

CN     111480391 A     7/2020
CN     111699723 A     9/2020
(Continued)

OTHER PUBLICATIONS

K.-H. Lin, H.-H. Liu, K.-H. Hu, A. Huang and H.-Y. Wei, "A Survey on DRX Mechanism: Device Power Saving From LTE and 5G New Radio to 6G Communication Systems," in IEEE Communications Surveys & Tutorials, vol. 25, No. 1, pp. 156-183, Firstquarter 2023, doi: 10.1109/COMST.2022.3217854. (Year: 2023).*
(Continued)

*Primary Examiner* — William D Cumming
(74) *Attorney, Agent, or Firm* — Blank Rome LLP

(57) ABSTRACT

Techniques for power savings by a wireless device. The technique including receiving, by a first wireless device, a set of sidelink resources for communicating directly with a second wireless device from a wireless node, determining, by the first wireless device, to transmit sidelink data to the second wireless device, receiving sidelink coordination information, the sidelink coordination information including discontinuous reception (DRX) configuration information of the second wireless device, transmitting a sidelink resources
(Continued)

request to the wireless node, the sidelink resources request including assistance information based on the received sidelink coordination information, receiving a sidelink resources grant from the wireless node, and transmitting the sidelink data based on the sidelink resources grant.

16 Claims, 15 Drawing Sheets

(58) Field of Classification Search
CPC ............... H04W 72/563; H04W 72/30; H04W 52/0216; H04W 4/40
USPC ............................................ 455/458; 370/332
See application file for complete search history.

(56) References Cited

U.S. PATENT DOCUMENTS

| | | | |
|---|---|---|---|
| 10,568,066 B2* | 2/2020 | Su ........................ | H04W 68/02 |
| 2016/0066296 A1* | 3/2016 | Su ....................... | H04W 64/003 |
| | | | 455/458 |
| 2017/0135067 A1* | 5/2017 | Su ........................ | H04W 76/28 |
| 2019/0098689 A1 | 3/2019 | Wei | |
| 2019/0239185 A1* | 8/2019 | Su ....................... | H04W 68/005 |
| 2020/0120604 A1 | 4/2020 | Nam | |
| 2022/0322360 A1* | 10/2022 | Ye ........................ | H04W 72/563 |
| 2022/0361284 A1* | 11/2022 | Liu ................... | H04W 52/0216 |
| 2023/0098973 A1* | 3/2023 | Yang .................... | H04W 72/30 |
| | | | 370/312 |

FOREIGN PATENT DOCUMENTS

| | | | | |
|---|---|---|---|---|
| EP | 3637898 A1 | 4/2020 | | |
| WO | 2018064477 A1 | 4/2018 | | |
| WO | 2018208114 A1 | 11/2018 | | |
| WO | WO-2021147597 A1 * | 7/2021 | .............. | H04W 4/40 |

OTHER PUBLICATIONS

MediaTek Inc., "Power saving techniques for sidelink," 3GPP Draft, R1-2005642, vol. RAN WG1 #102, Aug. 8, 2020, XP051917618.

* cited by examiner

SIDELINK WAKE-UP SIGNAL FOR A WIRELESS DEVICE

FIELD

The present application relates to wireless devices and wireless networks including devices, computer-readable media, and methods for sidelink paging.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects relate to devices, computer-readable media, and methods for power saving for a wireless device. These aspects include determining, by a first wireless device, a set of sidelink resources for communicating directly with a second wireless device, receiving sidelink coordination information, the sidelink coordination information including discontinuous reception (DRX) configuration information of the second wireless device, determining, by the first wireless device, to transmit sidelink data to the second wireless device, determining, by the first wireless device, a set of candidate sidelink resources for transmitting the sidelink data based on the received DRX configuration, selecting, from the set of candidate sidelink resources, a sidelink resource, and transmitting the sidelink data to the second wireless device on the selected sidelink resource.

Another aspect relates to devices, computer-readable media, and methods for power saving for a wireless device. These aspects include receiving, by a first wireless device, a set of sidelink resources for communicating directly with a second wireless device from a wireless node, receiving sidelink coordination information, the sidelink coordination information including discontinuous reception (DRX) configuration information of the second wireless device, determining, by the first wireless device, to transmit sidelink data to the second wireless device, transmitting a sidelink resources request to the wireless node, the sidelink resources request including assistance information based on the received sidelink coordination information, receiving a sidelink resources grant from the wireless node, and transmitting the sidelink data based on the sidelink resources grant.

Another aspect relates to devices, computer-readable media, and methods for power saving for a wireless device. These aspects include receiving, by a first wireless device, a set of sidelink resources for communicating directly with a second wireless device, determining a discontinuous reception (DRX) configuration and a sidelink wake-up signal (SWUS) monitoring window, transmitting an indication of the DRX configuration to a second wireless device, monitoring for a SWUS during the SWUS monitoring window, and skipping monitoring during a DRX-on duration associated with the SWUS monitoring window when a SWUS is not detected during the SWUS monitoring window.

Another aspect relates to devices, computer-readable media, and methods for power saving by a wireless device. These aspects include receiving, by a first wireless device, a set of sidelink resources for communicating directly with a second wireless device, receiving sidelink coordination information, the sidelink coordination information including discontinuous reception (DRX) configuration information of the second wireless device, determining a sidelink wake-up signal (SWUS) monitoring window of the second wireless device based on the DRX configuration information, transmitting a SWUS during the SWUS monitoring window, and transmitting the sidelink data to the second wireless device based on the DRX configuration information.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings.

Figure 1:
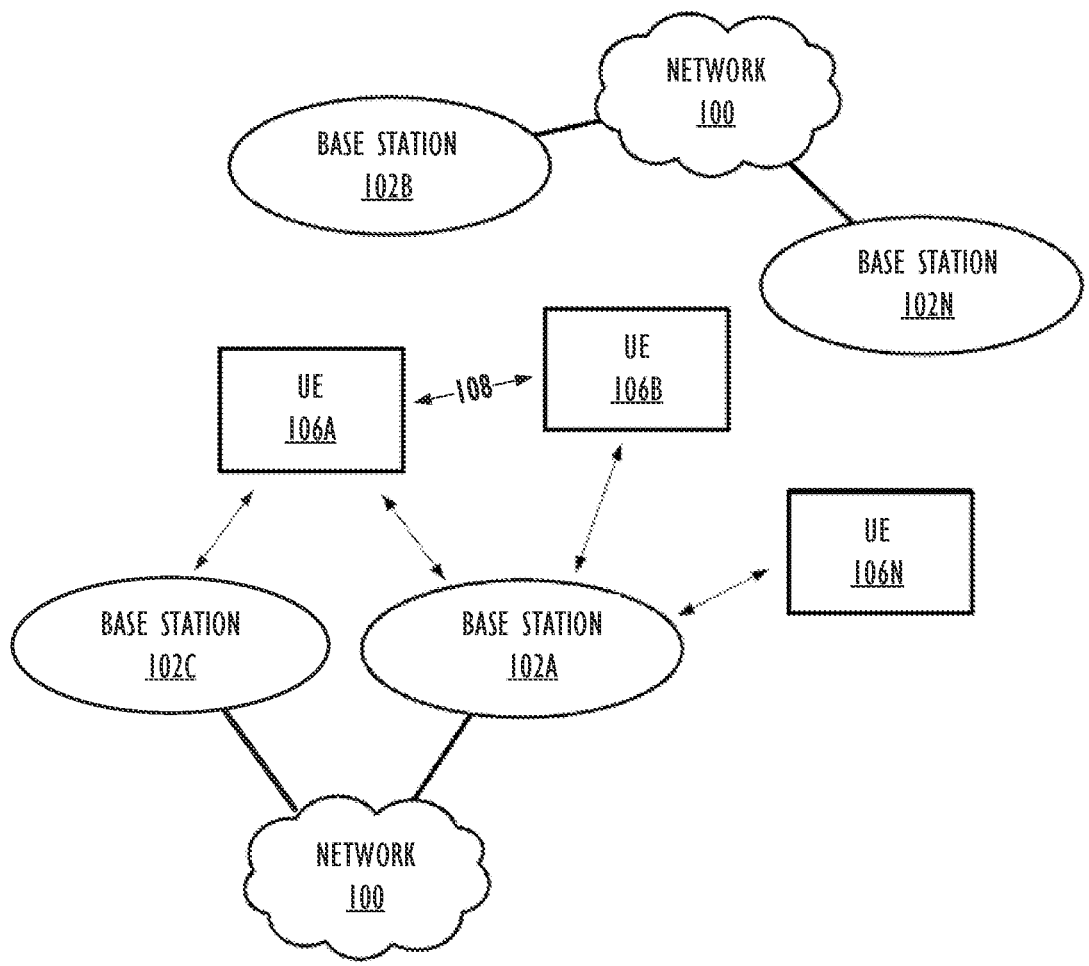
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In certain wireless communications systems, a wireless device may communicate directly with another wireless device without being routed through, for example, a wireless node. For example, a wireless device may establish a sidelink session with another peer wireless device. Once the sidelink session is established, the wireless device may listen for messages from the other peer wireless device and vice versa. To help reduce power consumption, sidelink discontinuous reception (DRX) may be implemented to allow the wireless devices to only listen for messages during a certain time period. What is desired is a technique for paging to further reduce power consumption.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device, a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™. Android™-based phones), portable gaming devices (e.g., Nintendo DS™, PlayStation Portable™. Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the term "UE" or "UE device" can be broadly defined to encompass any electronic, computing, and/or telecommunications device (or combination of devices) which is transportable by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB." etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements. ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some embodiments, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a physical sidelink shared channel (PSSCH), a physical sidelink control channel (PSCCH), a physical sidelink broadcast channel (PSBCH), and a physical sidelink feedback channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
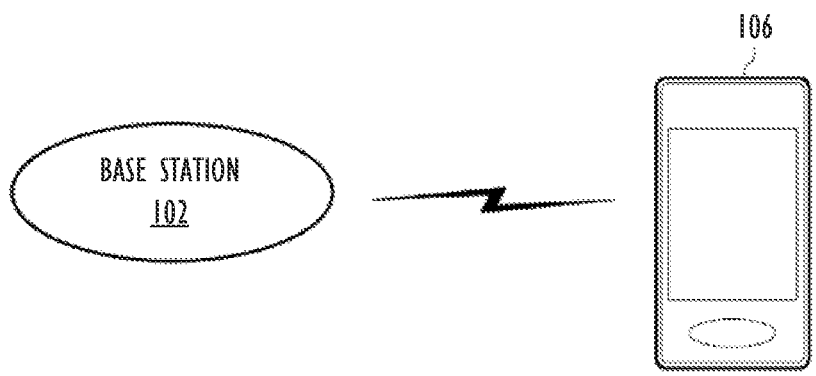
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some embodiments, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
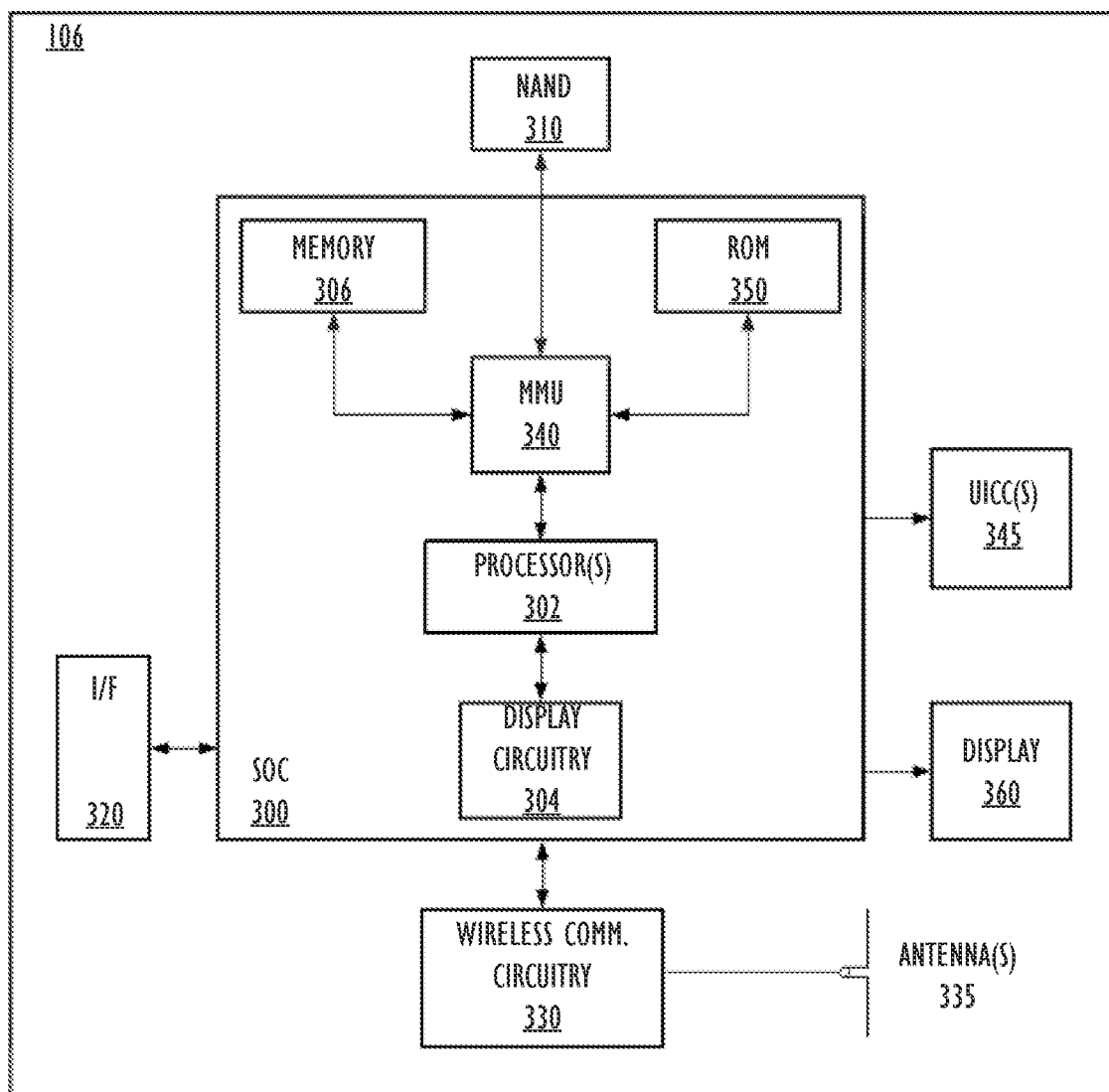
FIG. 3 illustrates an example block diagram of a UE, according to some Aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
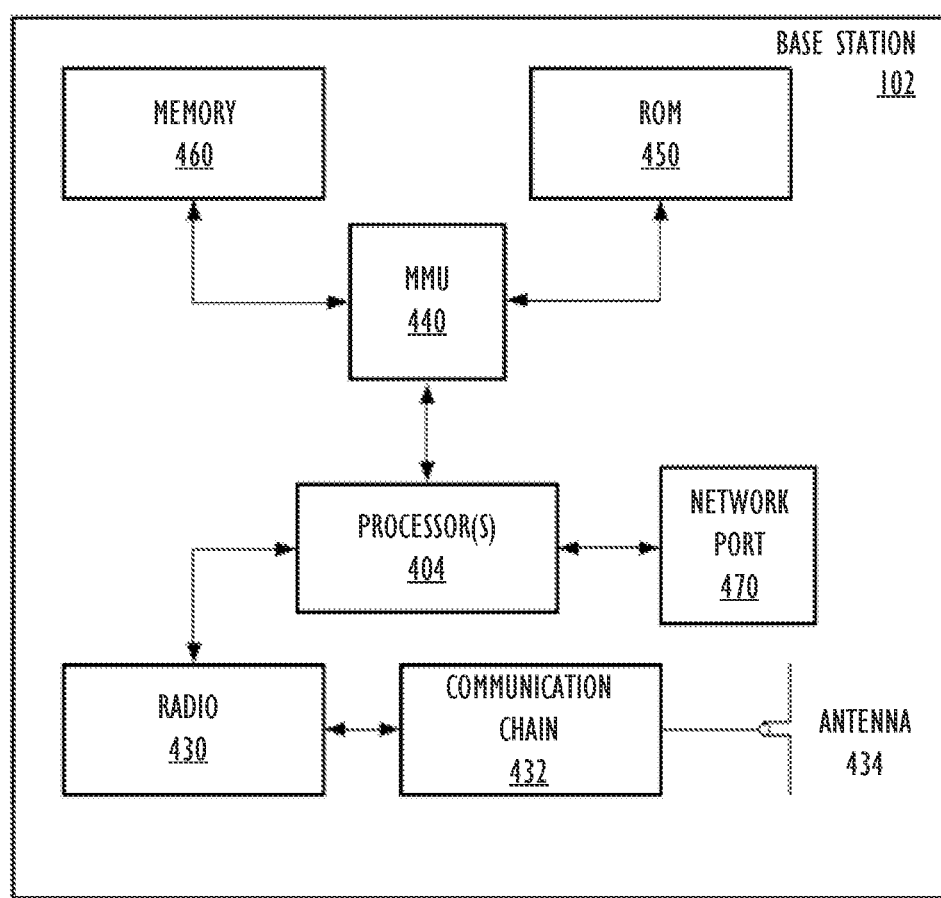
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
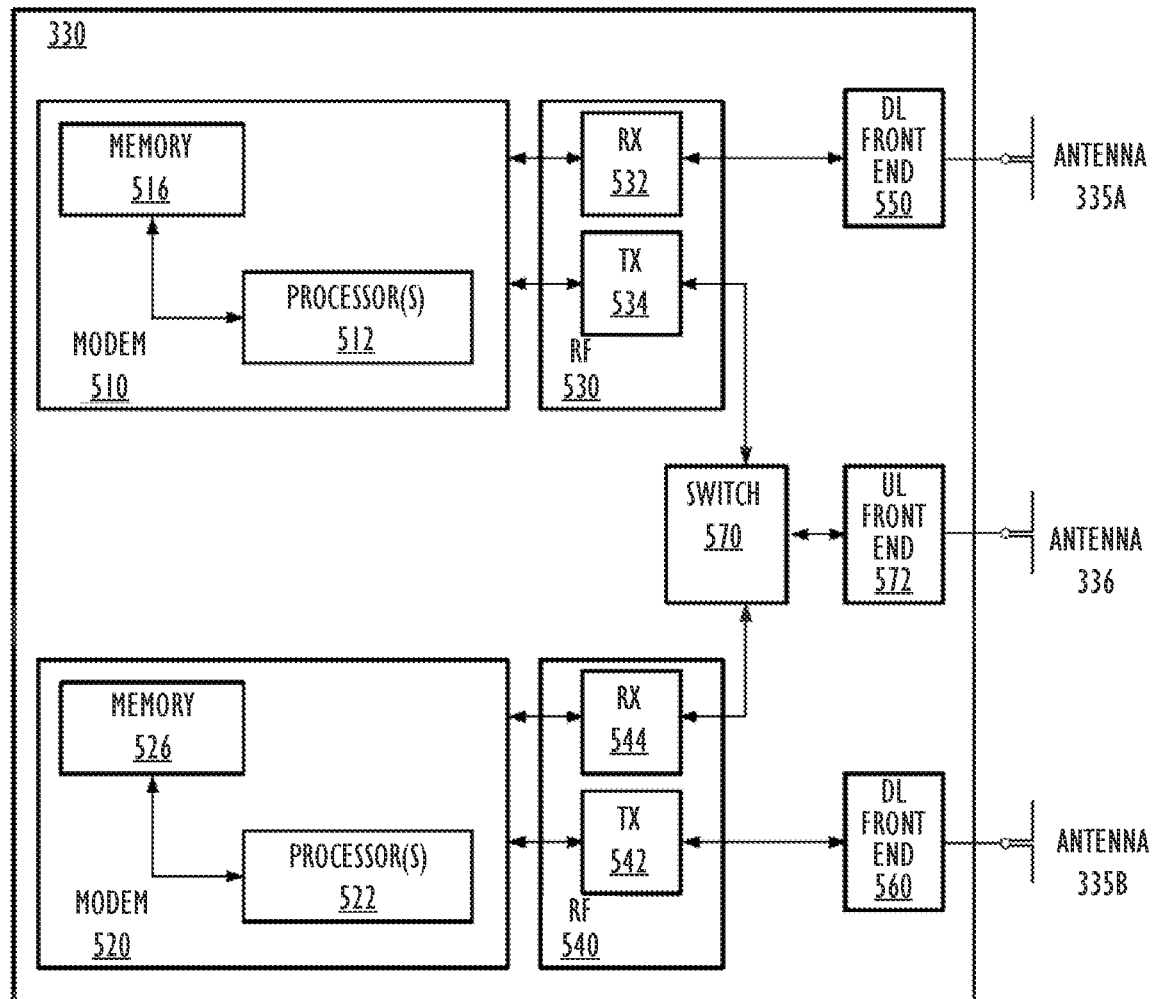
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit, other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively, directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
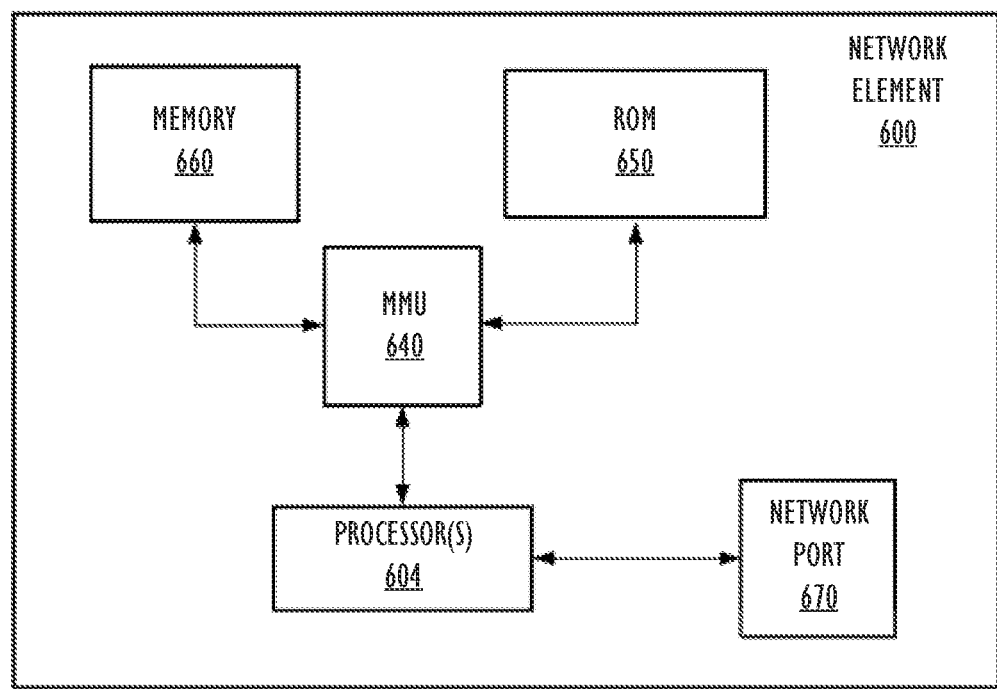
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Discontinuous Reception (DRX)

In some wireless networks, discontinuous reception (DRX) is used to increase wireless device battery life. A wireless device may use a set of resources (e.g., time, frequency) for downlink from the wireless network. Without DRX, a wireless device would actively monitor for a signal from the wireless network with the entire set of resources. DRX allows a wireless device to monitor for a signal from the wireless network with a subset of the resources. For example, DRX may follow a DRX cycle where for a first period of time the wireless device is in an active state to monitor for a scheduling signal from the wireless network, and during the remainder of the DRX cycle the wireless device may enter into a relatively lower power state (e.g., sleep state) if a scheduling message is not received. Thus, the wireless device can skip downlink channels from the wireless network to improve battery performance.

Figure 7:
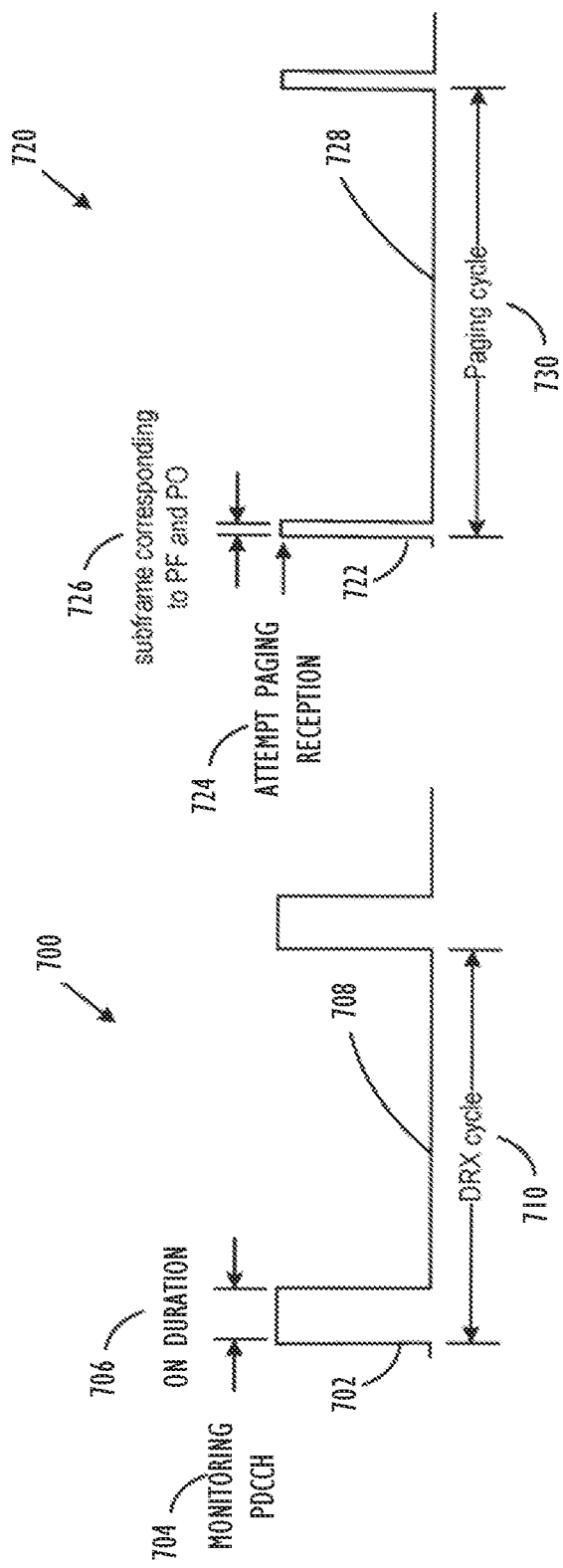
FIG. 7 illustrates discontinuous reception (DRX) operation for a wireless device in a wireless system in both a radio resource control (RRC) connected mode and an idle mode, in accordance with aspects of the present disclosure.

FIG. 7 illustrates DRX operation for a wireless device in a wireless system in both a radio resource control (RRC) connected mode 700 and an idle mode 720, in accordance with aspects of the present disclosure. DRX mechanisms may be supported for both the RRC connected mode 700 and the idle mode 720 for power saving.

For RRC connected mode 700, a wireless device connects to a wireless node and enters an active state 702 to monitor 704 a physical downlink control channel (PDCCH) during an on duration period 706. If the wireless device does not receive any scheduling information during the on duration period 706, the wireless device can enter a sleep state 708 during a remaining DRX cycle 710. If the wireless device receives a scheduling information, an inactivity timer (re) starts. The wireless device can enter a sleep state during any period remaining in the DRX cycle after the inactivity timer ends.

For a wireless device not connected to a wireless node and in an RRC idle mode 720, the wireless device enters an active state 722 to attempt to receive paging 724 in a subframe 726 corresponding to paging frame (PF) and paging occasion (PO) calculated defined by the rule. Normally, the idle UE also performs measurement during the active state 722 and can enter a sleep state 728 in a remaining paging cycle 730.

Sidelink Communications

In a sidelink scenario, the wireless device is communicating directly with other wireless devices without communications having to be routed through a wireless node. For sidelink connections between wireless devices, according to some implementations, a dedicated sidelink resource pool may be determined for wireless devices. In some cases, the sidelink resource pool may be determined based on sidelink modes that the wireless devices are in. For example, two sidelink modes may be defined in some cases. In the first sidelink mode, the wireless device may obtain sidelink resource pool information from a wireless network, for example, via a configuration message such as a DCI format 3_0 message from a wireless node. In the second sidelink mode, a transmitting wireless device may sense a physical medium, such as a set of radio frequencies, to determine a set of unused frequency resources, and select from the set of unused frequency resources, the sidelink resource pool. A set of rules may be defined for how the frequency resources may be selected and the frequency resources may vary based on a location of the wireless device. In the second sidelink mode, one or more of the wireless devices may be either connected, not connected, or outside of a wireless network coverage area.

In some cases, from the reception point of view, a wireless device may monitor all possible resources from the sidelink resource pool. The continual monitoring may not be desirable for power efficiency. In order to reduce the power consumption used to monitor the sidelink resource pool, DRX mechanisms for sidelink may be implemented. In some cases, device-to-device communication (for both transmission and reception) over sidelink may be done in LTE uplink frequency bands.

Sidelinks (e.g., via the PC5 interface) are the logical direct interface between wireless devices. In some embodiments of DRX for sidelinks, a wireless node configures coordinated resources (or coordinated DRX timing information) for a relay wireless device and other wireless device, such as remote wireless devices. In some embodiments, the relay wireless device directly configures dedicated sidelink resources (or DRX timing information) to the remote wireless devices and informs that configuration to the wireless node. In other embodiments, the relay wireless device and remote wireless devices may determine DRX timing information for the remote wireless devices implicitly based on a defined set of rules (e.g., using device ids).

Figure 8:
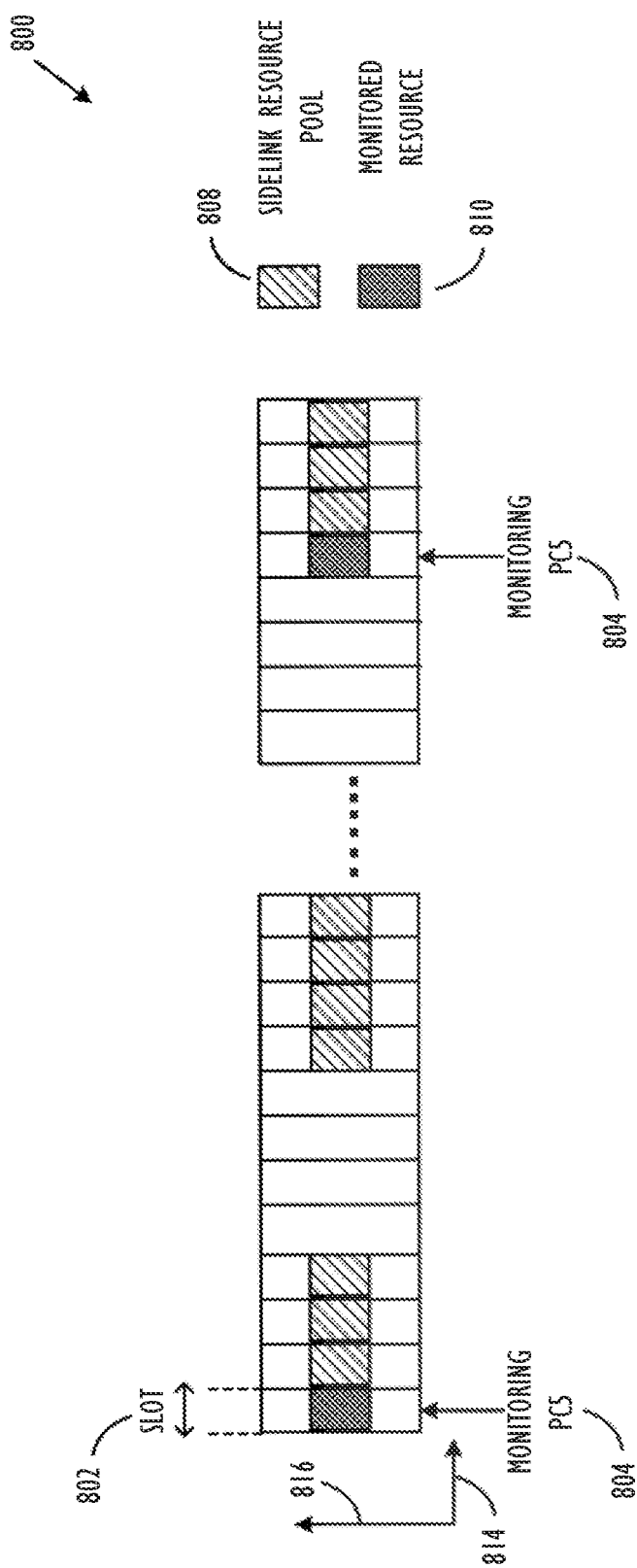
FIG. 8 illustrates DRX operation on a sidelink of a remote wireless device, in accordance with aspects of the present disclosure.

FIG. 8 illustrates DRX operation on a sidelink 800 of a remote wireless device, in accordance with aspects of the present disclosure. Resources of a remote wireless device may include resources in both a frequency-domain 816 and a time-domain 814. For example, in the time-domain 814, the resources of a remote wireless device may be segmented into periods of time or slots 802. One or more portions of the resources of the remote wireless device may be used for sidelink (e.g., the sidelink resources pool 808). In some cases, DRX mechanisms may be used so that the remote wireless device can monitor 804 a subset of the sidelink resources pool 808. The example embodiment shown in FIG. 8 illustrates a DRX mechanism implemented to conserve the time-domain 814 resources. In other embodiments DRX mechanisms may conserve the frequency-domain 812 resources in addition to or instead of the time-domain 814 resources.

Each sidelink may include a dedicated resource pool for a sidelink comprising the monitoring resources 810 and non-monitoring resources 808. The remote wireless device may monitor for a signal on the sidelink using the monitoring resources 810 in an active state and enter a sleep state during the non-monitoring resources 808. The monitoring periods or resources 804 may be configured by either a relay wireless device or a wireless node, as discussed above. A dedicated resource pool includes part of whole resource pools. In some cases, the dedicated resource pool is made of discontinuous resources in either the time-domain, frequency-domain, or both.

As shown, the remote wireless device monitors part of a whole dedicated resource pool. For example, in some embodiments, only a few slots in the time-domain may be monitored, allowing the remote wireless device to enter a sleep state during the remaining subframes. In FIG. 8, the whole RX resource pool for device-to-device communication includes time periods or subframes designated as the monitoring resources 810 and non-monitoring resources 808. The monitoring resources 810 in reference to FIG. 8 indicate periods of times where the remote wireless device monitors (e.g., does reception operation) on the sidelink interface. Non-monitoring resources 808 are subframes in which the wireless device may enter a sleep state or receive additional data based on a scheduling signal received during the monitoring resources 810.

The dedicated RX resource pool may be specific for a sidelink between a relay wireless device and the remote wireless device. In some cases, the resources may be discontinuous. For example, the resources may be located at multiple, frequencies. Accordingly, the relay wireless device transmits information using a corresponding dedicated transmit (TX) resource pool specific to the sidelink. For example, a corresponding dedicated TX resource pool may include a starting subframe to transmit data through the sidelink to the remote wireless device during the monitoring resources 810.

Monitoring resources during the DRX on duration, rather than constantly monitoring the whole resources pool helps reduce power consumption of the wireless device as the wireless device may enter a relatively low power state (e.g., sleep, or other lower power state) as compared to w % ben constantly monitoring the whole resources pool. For example, the wireless device may partially or completely power down the RF front end, modem, one or more processers, and/or other component that may be used to monitor the resources pool. While monitoring during the DRX on durations can help reduce power consumption, additional power savings can be had by further reducing the amount of monitoring needed.

Sidelink Resource Selection

A wireless device operating in a second sidelink mode, may sense a physical medium to determine, from a sidelink resources pool, which resources to select to use for a sidelink transmission. To determine the which resources to use, the wireless device may first identify a set of candidate resources. In some cases, candidate resources may be identified by identifying a quality of service (QoS) requirement based on the sidelink data to be transmitted. For example, higher priority sidelink data may be associated with a higher QoS requirement. The QoS requirement may be used to determine an initial reference signal received power (RSRP) threshold for the candidate resources. The wireless device may also determine a resource selection window for a future time when the resources may be selected for transmission, along with a total number of candidate resources, $M_{total}$. A running set of candidate resources, $S_A$ may be set to all of the resources of the sidelink resources pool in the resource selection window. The wireless device may sense the physical medium during a sensing window. If a candidate resource is not sensed during the sensing window with configured resource reservation periods prior to the resource selection window, the candidate resources may be excluded from the running set $S_A$. While sensing the physical medium, the wireless device may receive one or more sidelink control information (SCI) messages transmitted between other wireless devices. These SCI messages may include resource reservation information indicating resources that the other wireless devices intend to use in the future. The wireless device may decode these SCI messages to see if the SCI messages include resource reservations within the candidate resources. Additionally, a RSRP measurement of the SCI message may be determined. If the RSRP measurement of the SCI message is above a threshold level and the SCI message includes resource reservations within the candidate resources, those candidate resources which are included in these resource reservations may be excluded from the running set $S_A$. The threshold RSRP measurement may be determined based, for example, on the QoS requirement of the sidelink data. If a number of resources in the running set $S_A$ drops below a certain percentage of the initial total number of candidate resources, $M_{total}$, then the RSRP threshold may be adjusted, such as by increasing the RSRP threshold, resetting the resources in the running set $S_A$, and re-sensing the physical medium to determine whether to exclude resources from the running set $S_A$, as discussed above.

Figure 9:
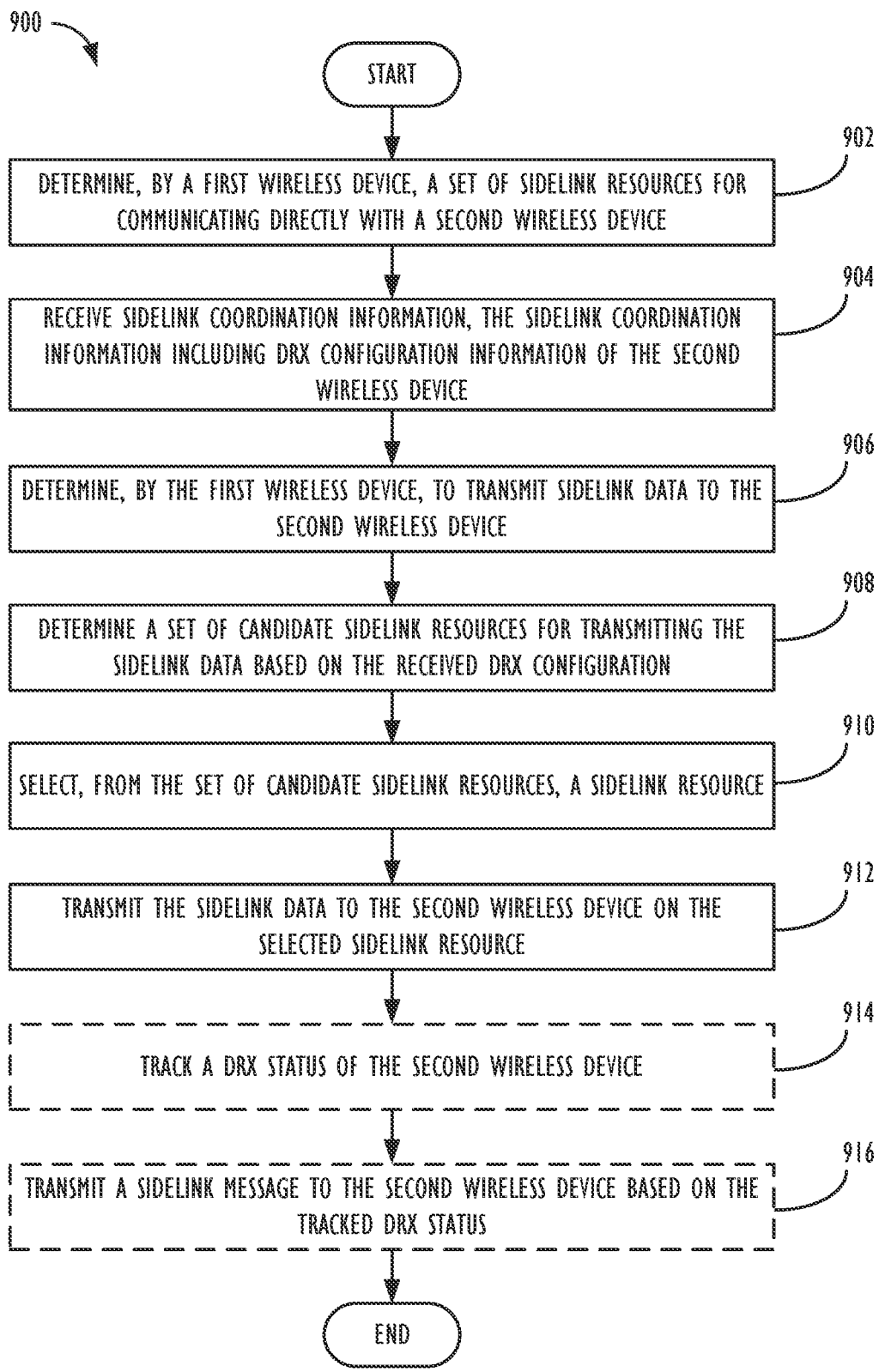
FIG. 9 is a flow diagram illustrating an overview of sidelink DRX coordination in a second sidelink mode, in accordance with aspects of the present disclosure.

If the number of resources in the running set $S_A$, after exclusions, is above the certain percentage, then the wireless device may select from the running set $S_A$, resources for to use for the sidelink transmission. This running set $S_A$, after exclusions, may be referred to as the candidate resource set from which a sidelink transmission resource may be selected. In some cases, the selection of the sidelink transmission resource from the candidate resource set may be a random selection.

Where the intended receiving peer wireless device is configured with sidelink DRX the above discussed sequence may be modified to take into account the receiving peer wireless device's DRX status. FIG. 9 is a flow diagram 900 illustrating an overview of sidelink DRX coordination in a second sidelink mode, in accordance with aspects of the present disclosure. At block 902, the first wireless device may determine a set of resources for communicating directly with a second wireless device. For example, the wireless device may obtain sidelink resources pool configuration information, indicating a set of resources that may be used for sidelink communications. In some cases, the wireless device may be operating in a first sidelink mode and the wireless device may receive sidelink resources pool information from a wireless network. In some cases, the wireless device may be operating in a second sidelink mode and the wireless device may sense the physical medium and determine resources of the sidelink resources pool. This determination of resources of the sidelink resources pool may be based, for example, on a sidelink resources pool previously received from a wireless node. As another example, a predetermined set of resources for the sidelink resources pool may be predetermined based on a location of the wireless device.

At block 904, the first wireless device (e.g., transmitting wireless device) receives sidelink coordination information, the sidelink coordination information including a DRX configuration of the second wireless device. Sidelink coordination messages may include information to help peer wireless devices coordinate sidelink transmissions. Examples of this information may include signal measurements. DRX information, etc. In some cases, the receiving peer wireless device may transmit it's DRX configuration to the wireless device. In other cases, the receiving peer wireless device may transmit it's DRX configuration to a helper wireless device, which may then pass on the DRX information to the wireless device. Thus, the DRX configuration information is received from a third wireless device. The sidelink coordination information may be received by the wireless device before, after, or concurrent with the determination to transmit sidelink data to the second device.

The sidelink coordination information may include the receiving peer wireless device's sidelink DRX configuration. In some cases, the sidelink coordination information may indicate a state of the receiving peer wireless device, such as whether the receiving peer wireless device is in a relatively low power state, such as a sleep mode, a starting time offset of the DRX-off occasion, whether the onDurationTimer is running (e.g., in a DRX on state), and/or whether the inactivityTimer is running (e.g., timer for entering the relatively low power state).

At block 906, the first wireless device may determine to transmit sidelink data to the second wireless device. For example, the first wireless device may need to transmit data to the second wireless device.

At block 908, the first wireless device determines a set of candidate sidelink resources for transmitting the sidelink data based on the received DRX configuration. In some cases, determining the set of candidate sidelink resources may include sensing at least a portion of the set of sidelink resources to determine a set of candidate sidelink resources, and adjusting the set of candidate sidelink resources based on the received DRX configuration. In some cases, adjusting the set of candidate sidelink resources comprises adjusting a start time of the candidate sidelink resources based on a DRX-on duration start time indicated in the received DRX configuration of the second wireless device. In some cases, adjusting the set of candidate sidelink resources comprises adjusting an end time of the candidate sidelink resources based on a DRX-on duration end time indicated in the received DRX configuration of the second wireless device. In some cases, adjusting the set of candidate sidelink resources comprises adjusting a start time of the candidate sidelink resources based on a DRX-on duration start time indicated in the received DRX configuration of the second wireless device, and adjusting an end time of the candidate sidelink resources based on a DRX-on duration end time indicated in the received DRX configuration of the second wireless device. In some cases, adjusting the set of candidate sidelink resources comprises excluding candidate sidelink resources based on a comparison of the candidate sidelink resources in the set of candidate sidelink resources and a DRX-on duration time indicated in the received DRX configuration of the second wireless device.

At block 910, the first wireless device may select, form the set of candidate sidelink resources, a sidelink resources. For example, the wireless device may select sidelink resources that avoid the DRX-off durations of the receiving peer wireless device. As another example, selecting a sidelink resource may include selecting a sidelink resource based on a DRX-on duration time indicated in the received DRX configuration of the second wireless device. At block 912, the first wireless device may transmit the sidelink data to the second wireless device on the selected sidelink resource.

At optional block 914, the first wireless device may track a DRX status of the second wireless device, and at optional block 916, the first wireless device may transmit a sidelink message to the second wireless device based on the tracked DRX status.

Figure 10:
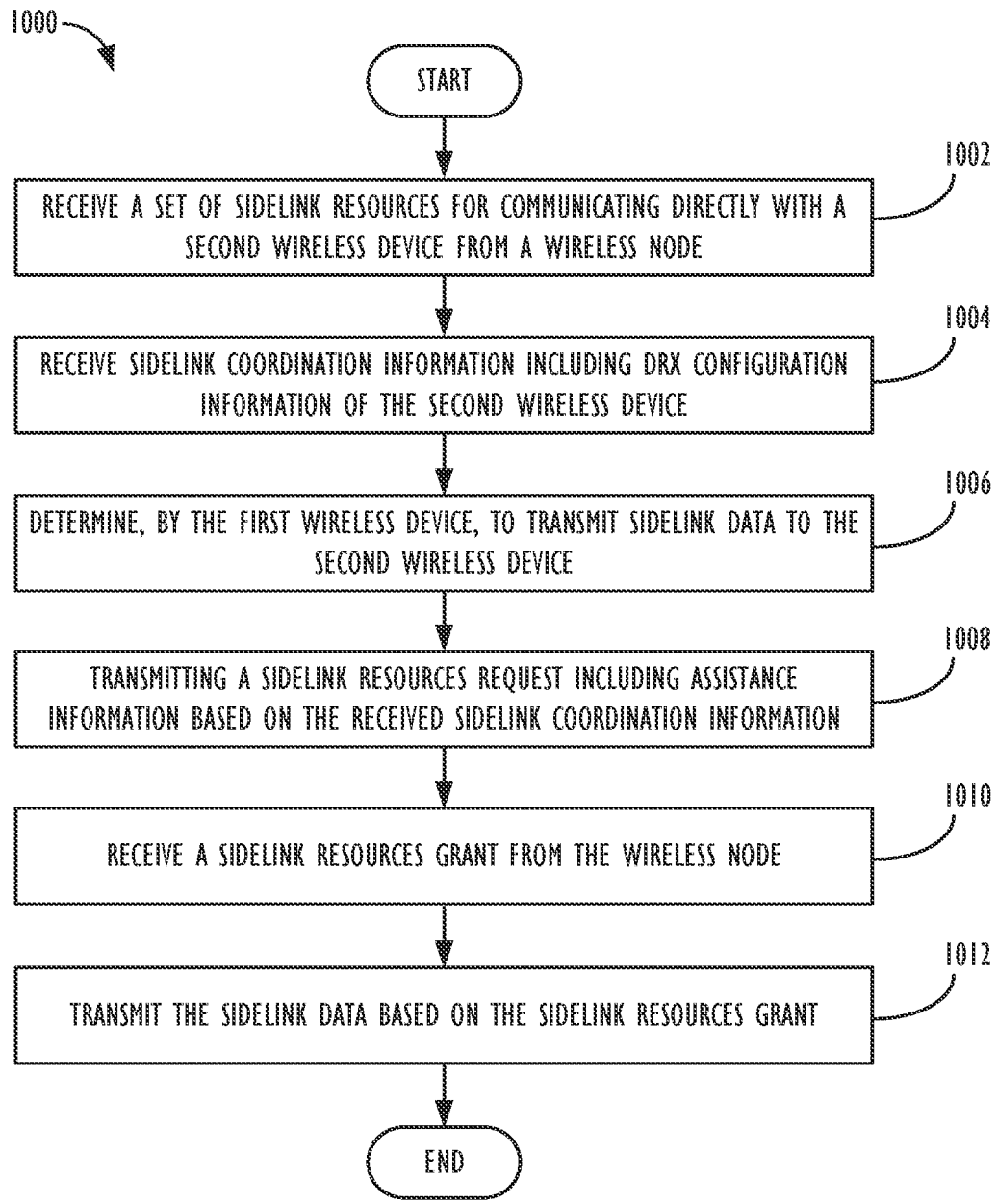
FIG. 10 is a flow diagram 1000 illustrating an overview of sidelink DRX coordination in a first sidelink mode, in accordance with aspects of the present disclosure.

FIG. 10 is a flow diagram 1000 illustrating an overview of sidelink DRX coordination in a first sidelink mode, in accordance with aspects of the present disclosure. In the first sidelink mode, the sidelink transmissions as among the sidelink wireless devices are scheduled by a wireless node, such as an eNB, gNB, RSU, etc. At block 1002, the first wireless device (e.g., transmitting wireless device) receives a set of sidelink resources for communicating directly with a second wireless device from a wireless node. At block 1004, the first wireless device receives sidelink coordination information, the sidelink coordination information including discontinuous reception (DRX) configuration information of the second wireless device. As in the second sidelink mode case discussed above, the sidelink coordination information may include DRX configuration information for the receiving peer wireless device and the sidelink coordination information may be received from the receiving peer wireless device or a helper wireless device. In some cases, the receiving peer wireless device may transmit it's DRX configuration to the wireless device. In other cases, the receiving peer wireless device may transmit it's DRX configuration to a helper wireless device, which may then pass on the DRX information to the wireless device. Thus, the DRX configuration information is received from a third wireless device.

At block 1006, the first wireless device determines to transmit sidelink data to the second wireless device. For example, the first wireless device may need to transmit data to the second wireless device.

At block 1008, the first wireless node may transmit a sidelink resources request to the wireless node, the sidelink resources request including assistance information based on the received sidelink coordination information. For example, the wireless device may transmit a sidelink resources request to the wireless node. The sidelink resources request may include information based on the DRX configuration information, for example, as assistance information. In some cases, the first wireless device may include the receiving peer wireless device's wireless device identifier in the assistance information sent to the wireless node. In the first sidelink mode, the receiving peer wireless device may be connected to the same wireless node that the first wireless device is connected to. The wireless node may then know the sidelink DRX configuration along with other DRX configuration (e.g., for the non-sidelink connection with the wireless system). The wireless node may then assign sidelink resources to the first wireless node based on the assistance information avoiding the DRX-off durations of the receiving peer wireless device.

In some cases, the first wireless device may include the DRX configuration information of the receiving peer wireless device in the assistance information sent to the wireless node. The wireless node may then assign sidelink resources to the first wireless node based on the assistance information avoiding the DRX-off durations of the receiving peer wireless device.

In some cases, the first wireless device may include time restriction information based on the DRX-off durations of the receiving peer wireless device in the assistance information sent to the wireless node. The time restriction information may indicate what times the first wireless device does not (or does) want sidelink resources for. The wireless node may then assign sidelink resources to the first wireless node based on the time restrictions, thus avoiding the DRX-off durations of the receiving peer wireless device.

At block 1010, the first wireless device receives a sidelink resources grant from the wireless node. At block 1012, the first wireless device transmits the sidelink data to the second wireless device on the selected sidelink resource. In some cases, the first wireless device may determine whether the granted sidelink transmission resources align with the DRX-on duration of the receiving peer wireless device, and if so, transmit the sidelink data to the receiving peer wireless device. If the transmission resources do not align with the DRX-on duration of the receiving peer wireless device, the first wireless device may buffer the sidelink data for later transmission. In some cases, the first wireless device may trigger a sidelink scheduling request (SR) or a buffer status report (BSR) if the first wireless device determines that the receiving peer wireless device is in the DRX-on duration (e.g., able to receive). Otherwise the first wireless device may buffer the sidelink data for later transmission.

Figure 11:
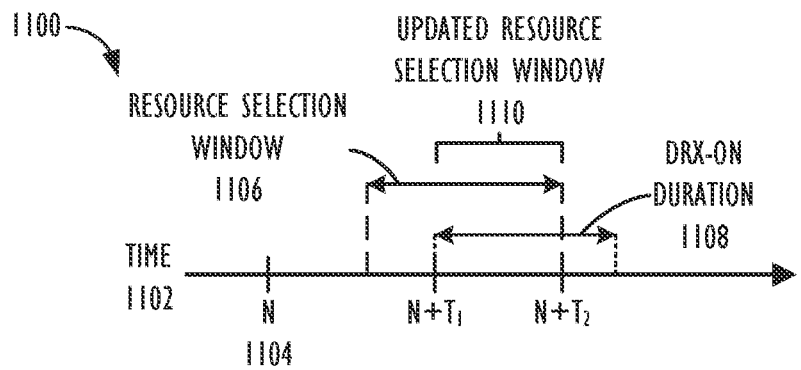
FIG. 11 is a timing diagram illustrating updating a resource selection window, in accordance with aspects of the present disclosure.

FIG. 11 is a timing diagram 1100 illustrating updating a resource selection window, in accordance with aspects of the present disclosure. The timing diagram 1100 includes a time axis 1102. At time n 1104, the wireless device may determine that the wireless device has sidelink data to transmit to a receiving peer wireless device. The wireless device may, as discussed above, determine a resource selection window 1106. The receiving peer wireless device may, in this example, have a DRX on-duration window 1108. Based on the DRX configuration information received by the wireless device, the wireless device may update the resource selection window 1110 by delaying the start of the resource selection window 1106. For example, the beginning of the resource selection window 1202 may be aligned with the start of the DRX-on duration window of the receiving peer wireless device, In this case the updated resource selection window 1110 considering the receiving peer wireless device's DRX-on duration may run from time $n+T_1$ to $n+T_2$. The wireless device may then select a sidelink transmission resource from the updated resource selection window 1110.

Figure 12:
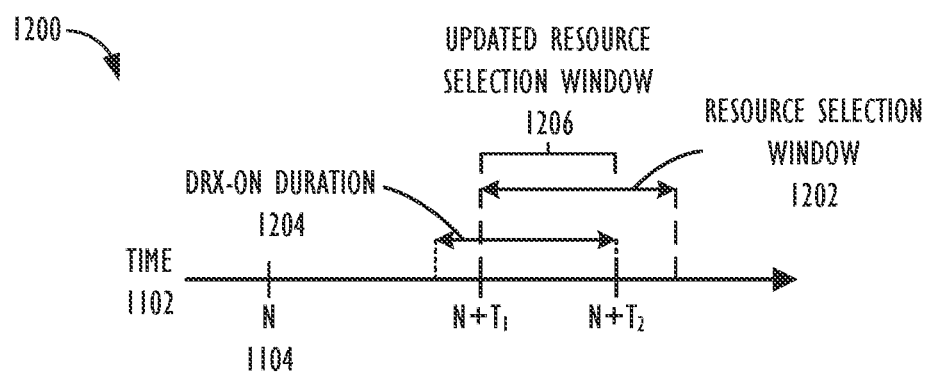
FIG. 12 is a timing diagram illustrating updating a resource selection window, in accordance with aspects of the present disclosure.

FIG. 12 is a timing diagram 1200 illustrating updating a resource selection window, in accordance with aspects of the present disclosure. In this example, wireless device may, as discussed above, determine the resource selection window 1202, which starts after the DRX on-duration window 1204 of the receiving peer wireless device. However, the resource selection window 1202 now extends beyond the DRX on-duration window 1204. Based on the DRX configuration information received by the wireless device, the wireless device may update the resource selection window 1206 by advancing the end of the resource selection window 1202. For example, the end of the resource selection window 1202 may be aligned with the expiry of the onDurationTimer of the receiving peer wireless device. As another example, end of the resource selection window 1202 may be aligned with the expiry of the inactivityTimer, based on whether the receiving peer wireless device has decoded the PSCCH to find a new transmission with a new data indicator toggled. In this case the updated resource selection window 1110 considering the receiving peer wireless device's DRX-on duration 1204 may run from time $n+T_1$ to $n+T_2$. The wireless device may then select a sidelink transmission resource from the updated resource selection window 1206.

Figure 13:
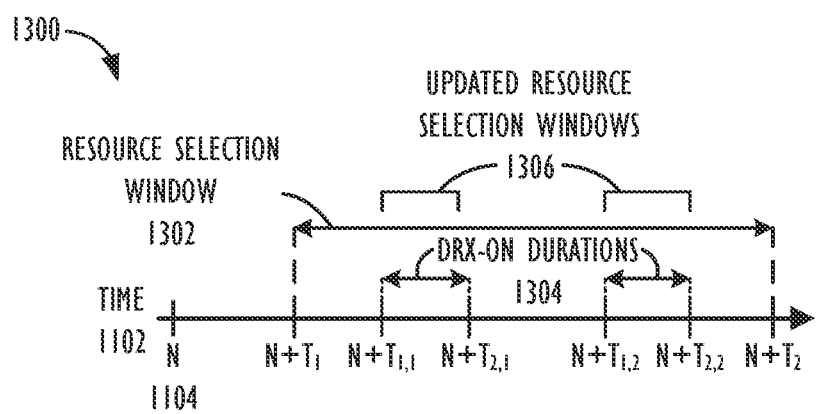
FIG. 13 is a timing diagram illustrating updating a resource selection window, in accordance with aspects of the present disclosure.

FIG. 13 is a timing diagram 1300 illustrating updating a resource selection window, in accordance with aspects of the present disclosure. In this example, wireless device may, as discussed above, determine the resource selection window 1302, which entirely includes one or more DRX on-duration windows 1304 of the receiving peer wireless device. Based on the DRX configuration information received by the wireless device, the wireless device may update the resource selection window 1306 based on the one or more DRX on-duration windows 1304 of the receiving peer wireless device in a manner similar to that discussed above with respect to FIGS. 11 and 12.

As discussed above with respect to FIGS. 11-13, a resource selection window may be determined and then updated based on the DRX on-duration window. In some cases, rather than determining and updating the resource selection window, resources which are outside of the receiving peer wireless device's DRX on-duration window may be excluded from the running set $S_A$. The running set $S_A$, after exclusions (e.g., candidate resource set) then would not need to be updated as the candidate resources identification process already takes into account the receiving peer wireless device's DRX on-duration window.

In some cases, rather than determining and updating the resource selection window, the selection process from the resource selection window may be updated to only select resources from within the receiving peer wireless device's DRX on-duration window. As an example, rather than randomly selecting a resource from a candidate resource set, the wireless device may first compare the randomly selected resource against the receiving peer wireless device's DRX on-duration window. If the randomly selected resource is not within the receiving peer wireless device's DRX on-duration window, the random selection may be repeated until a resource within the receiving peer wireless device's DRX on-duration window is selected.

In some cases, the first wireless device may be configured to track the DRX status of a receiving peer wireless device. Although a DRX configuration, such as onDurationTimer, starting offset, and inactivityTimer, may be commonly configured among a set of peer wireless devices in a sidelink session, a transmitting first wireless device may benefit from tracking a receiving peer wireless device's DRX status. For example, if the first wireless device has a relatively large amount of data to transmit to the receiving peer wireless device, the first wireless device can determine, after transmitting a first set of data to the receiving peer wireless device, that the receiving peer wireless device is still in active until the expiration of the inactivityTimer. The first wireless device may then transmit another paging message to the receiving peer wireless device to continue transmitting data to the receiving peer wireless device.

For tracking the DRX status of the receiving peer wireless device, the receiving peer wireless device may reset its inactivityTimer if the receiving peer wireless device receives any new SCI message addressed to it with a toggled new data indicator (e.g., indicating that new data is contained within the SCI message, rather than a retransmission). This is not limited to transmission from the first wireless device. As the first wireless device cannot control whether another wireless device transmits to the receiving peer wireless device, to more accurately track the DRX status of the receiving peer wireless device, the first wireless device may sniff the physical medium to try to detect SCI messages addressed to the receiving peer wireless device. For example, a SCI message may include a layer 1 (L1) identifier for the receiving peer wireless device. The first wireless device may sniff the physical medium, receive SCI messages on the physical medium and decode the received SCI messages to see if they include the L1 identifier for the receiving peer wireless device. If the first wireless device receives an SCI message addressed to the receiving peer wireless device, the first wireless device may reset its tracked version of the receiving peer wireless device's inactivityTimer. In some cases, the first wireless device may ignore the receive SCI messages addressed to the receiving peer wireless device if does not think the receiving peer wireless device will be able to decode the received SCI message. For example, if the received SCI message is associated with a relatively low signal quality or if the first wireless device does not detect an acknowledgement message from the receiving peer wireless device, the first wireless device may not reset its tracked version of the receiving peer wireless device's inactivityTimer.

In some cases, the inactivity timer of the receiving peer wireless device will be reset if the receiving peer wireless device transmits a message to another wireless device. To help the first wireless device track the DRX status of the receiving peer wireless device, the first wireless device may also sniff the physical medium to try to detect messages sent by the receiving peer wireless device. For example, the first wireless device may examine sidelink messages being transmitted in the sidelink resources pool too see if any of the sidelink messages include a source L1 ID of the receiving peer wireless device. If the first wireless device receives a message from the receiving peer wireless device, the first wireless device may reset its tracked version of the receiving peer wireless device's inactivityTimer.

Sidelink Wake-Up Signal

When sidelink DRX is configured, a receiving peer wireless device may be able to reduce power consumption, as compared to constantly monitoring the sidelink resources pool, by monitoring the sidelink resources pool during DRX-on intervals. Additional power savings may be had by not monitoring, e.g., skipping, monitoring during a DRX on-duration. In accordance with aspects of the present disclosure, a sidelink wake-up signal (SWUS) may be configured to help reduce power consumption of a wireless device.

Figure 14:
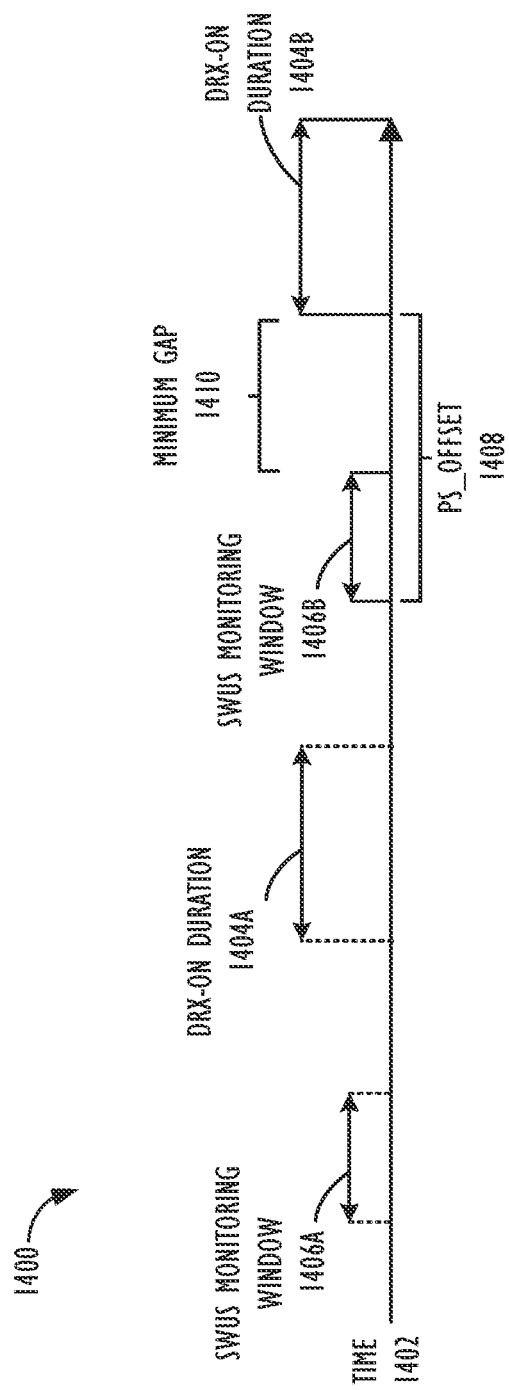
FIG. 14 is a timing diagram illustrating a sidelink wake-up signal (SWUS), in accordance with aspects of the present disclosure.

FIG. 14 is a timing diagram 1400 illustrating a SWUS, in accordance with aspects of the present disclosure. Timing diagram 1400 illustrates relationships between the SWUS and DRX on a time axis 1402. In this example a first wireless device may have sidelink data to transmit to a second wireless device. The first wireless device and second wireless device have already established a sidelink session. The second wireless device is also configured with sidelink DRX and is scheduled to monitor the sidelink resource pool during DRX-on durations 1404A and 1404B. The second wireless device may also be configured to monitor for a SWUS during a SWUS monitoring window 1406A and 1406B. The first wireless device may know the DRX-on durations 1404A and 1404B of the second wireless device. If the first wireless device does not need to transmit sidelink data to the second wireless device during, for example, a first DRX-on duration 1404A, the first wireless device may skip transmitting a SWUS message to the second wireless device during a first SWUS monitoring window 1406A. If the second wireless device does not receive a SWUS message during the first SWUS monitoring window 1406A, the second wireless device may skip monitoring the first DRX-on duration 1404A.

If the first wireless device has sidelink data to transmit to the second wireless device, the first wireless device may transmit a SWUS message to the second wireless device in, for example, a second SWUS monitoring window 1406B. If the second wireless device receives a SWUS message during the second SWUS monitoring window 1406B, the second wireless device may monitor an associated second DRX-on duration 1404B for the sidelink data.

In some cases, a SWUS message may be a sequence of symbols, such as in an NR physical uplink control channel (PUCCH) format 0 sequence. In some cases, the SWUS message may include a single bit indicating to the receiving wireless device to monitor the sidelink resources pool during the receiving wireless device's next DRX-on duration.

In some cases, the time when the SWUS message is transmitted, prior to an associated DRX-on duration, may be configured. In some cases, a common SWUS configuration for the SWUS message timing may be set for an entire sidelink resources pool. For example, the wireless device may obtain sidelink resources pool configuration information and the sidelink resources pool configuration information may include the SWUS message timing configuration. In some cases, the SWUS message timing may be configured per sidelink session (e.g., per PC5-RRC connection).

The configuration for the SWUS message timing may indicate the SWUS monitoring window, in some cases. For example, a SWUS configuration may include a sidelink power-saving offset (PS_offset) 1408 that indicates a time gap between a starting time of the SWUS monitoring window and a starting time of the associated DRX-on duration. In some cases, the SWUS configuration may also include a minimum gap which configures a minimum time gap 1410 between an end of the SWUS monitoring window and a starting time of the associated DRX-on duration. This minimum gap 1410 helps provide time for a receiving wireless device to exit a lower (e.g., reduced) power state to monitor the sidelink resources pool during the DRX-on duration.

Frequency resources may also be configured for the SWUS message. As with the SWUS message timing, in some cases, a common SWUS frequency configuration may be set for an entire sidelink resources pool. In some cases, the SWUS frequency resource may be shared with resources that are allocated for sidelink scheduling requests or sidelink paging. In some cases, multiple cyclic prefixes of sequences may be configured between a pair of wireless devices in a sidelink session as code resources for the SWUS.

Figure 15:
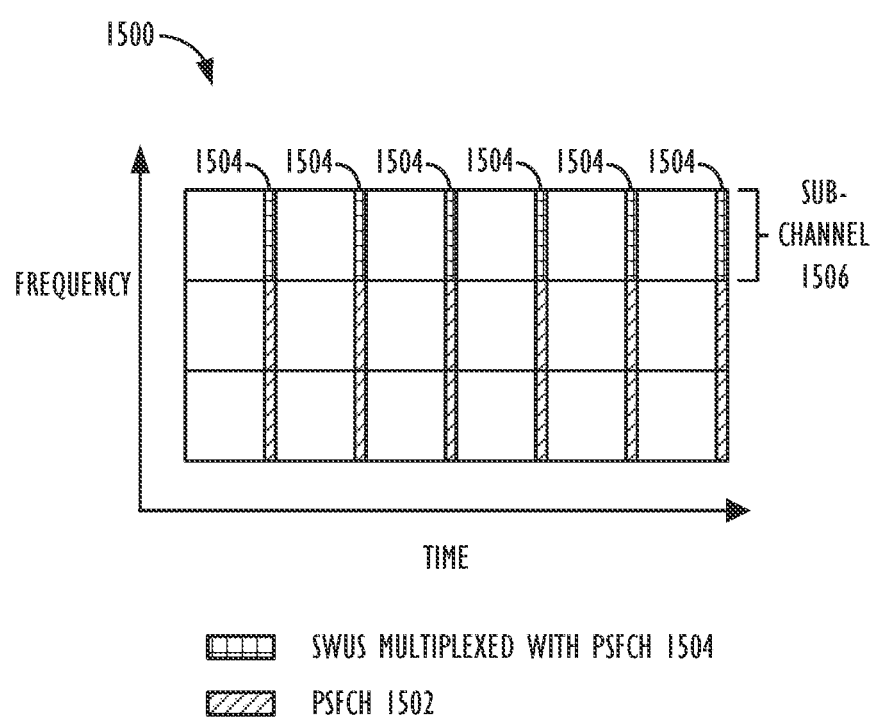
FIG. 15 is a resource grid illustrating multiplexing with physical sidelink feedback channel (PSFCH), in accordance with aspects of the present disclosure.

In some cases, the SWUS frequency resource may be a dedicated frequency resource. In some cases, the SWUS may be frequency domain multiplexed with PSFCH resources. FIG. 15 is a resource grid 1500 illustrating multiplexing with PSFCH, in accordance with aspects of the present disclosure. As shown in resource grid 1500, a last one or more symbols of a slot may be allocated for PSFCH 1502. The SWUS may be multiplexed 1504 in a portion of the PSFCH 1502 on frequency resources on a subchannel 1506.

In some cases, the SWUS time, frequency, and code resources may be configured per sidelink session (e.g., per PC5-RRC connection). For example, the wireless devices may negotiate resources for the SWUS as a part of setting up a sidelink session. In other cases, the SWUS time, frequency, and code resources may be determined based on a first wireless device identifier of the transmitting wireless device and a second wireless device identifier of the receiving wireless device. For example, the two identifiers may be hashed to a set of predetermined SWUS resource configuration.

To help further reduce power consumption of sidelink wireless devices, a sidelink go-to-sleep signal (SGTS) may be configured. The SGTS may be used to indicate to a receiving wireless device to enter a relatively lower power state (e.g., sleep mode, reduced power state, etc.). For example, when a wireless device receives the SGTS, the wireless device may deactivate its onDurationTimer and promptly enter the relatively lower power state. On the transmitter side, if a transmitting sidelink wireless device determines that it does not have any more data to send to the receiving peer wireless device and a remaining on-duration of the receiving peer wireless device is larger than a threshold time, the transmitting sidelink wireless device may send the SGTS message. This indicates, to the receiving peer wireless device, that there is no more data to receive and that the receiving peer wireless device may enter the relatively lower power state.

In some cases, the SGTS may be included at the end of a sidelink data transmission during a DRX on-duration. In some cases, a second stage SCI may be modified to include a bit indicating the SGTS. The second stage SCI may, for example, be a SCI format 2-A or SCI format 2B message. In some cases, a new second stage SCI message may be defined. In some cases, the receiving peer wireless device may transmit an acknowledgement of the SGTS message. For example, the receiving peer wireless device may transmit a sidelink hybrid automatic repeat request (HARQ) ACK feedback based on the SGTS message.

In some cases, the SGTS may be sent as a signal separate from the sidelink data signal. For example, the SGTS may be sent as a sequence of symbols, such as in an NR physical uplink control channel (PUCCH) format 0 sequence. The SGTS signal may be allocated frequency resources and these frequency resources may be configurable. As with the SWUS, in some cases, a common SGTS frequency configuration may be set for an entire sidelink resources pool. In some cases, the SGTS frequency resource may be a dedicated frequency resource. In some cases, the SGTS may be frequency domain multiplexed with PSFCH resources. In some cases, the SGTS frequency resource may be shared with resources that are allocated for sidelink scheduling requests or sidelink paging. In some cases, multiple cyclic prefixes of sequences may be configured between a pair of wireless devices in a sidelink session as code resources for the SGTS.

In some cases, the SGTS time, frequency, and code resources may be configured per sidelink session (e.g., per PC5-RRC connection). For example, the wireless devices may negotiate resources for the SGTS as a part of setting up a sidelink session. In other cases, the SGTS time, frequency, and code resources may be determined based on a first wireless device identifier of the transmitting wireless device and a second wireless device identifier of the receiving wireless device. For example, the two identifiers may be hashed to a set of predetermined SGTS resource configuration.

In some cases, a first wireless device may transmit a sleep notification message to other peer wireless devices to indicate that the first wireless device is entering the relatively lower power state. For example, if the first wireless device determines that it does not need to transmit sidelink data and is not receiving any sidelink data, the first wireless device may transmit the sleep notification to the other peer wireless devices. In some cases, the first wireless device may then begin to enter the relatively lower power state after transmitting the sleep notification. In other cases, the first wireless device may wait a period of time after transmitting the sleep notification before entering the relatively lower power state. If the first wireless device does not receive a transmission during this period of time, the first wireless device may enter the relatively lower power state. If the first wireless device does receive a transmission during this period of time, the first wireless device may stop trying to enter the relatively lower power state until the received transmission is completed. Signaling for the sleep notification may be performed in a way similar to that described above with respect to SGTS.

In some cases, a first wireless device may determine whether to enter the relatively lower power state based on a timer. For example, if the first wireless device determines that it does not need to transmit sidelink data and has not received a sidelink transmission within a certain time period, the first wireless device may enter the relatively lower power state. In some cases, the time period may be configurable. In some cases, the time period may be configured based in part on a power capacity of the wireless device. For example, wireless devices with a higher power capacity may be configured with a longer time period as compared to wireless devices with a lower power capacity.

Figure 16A:
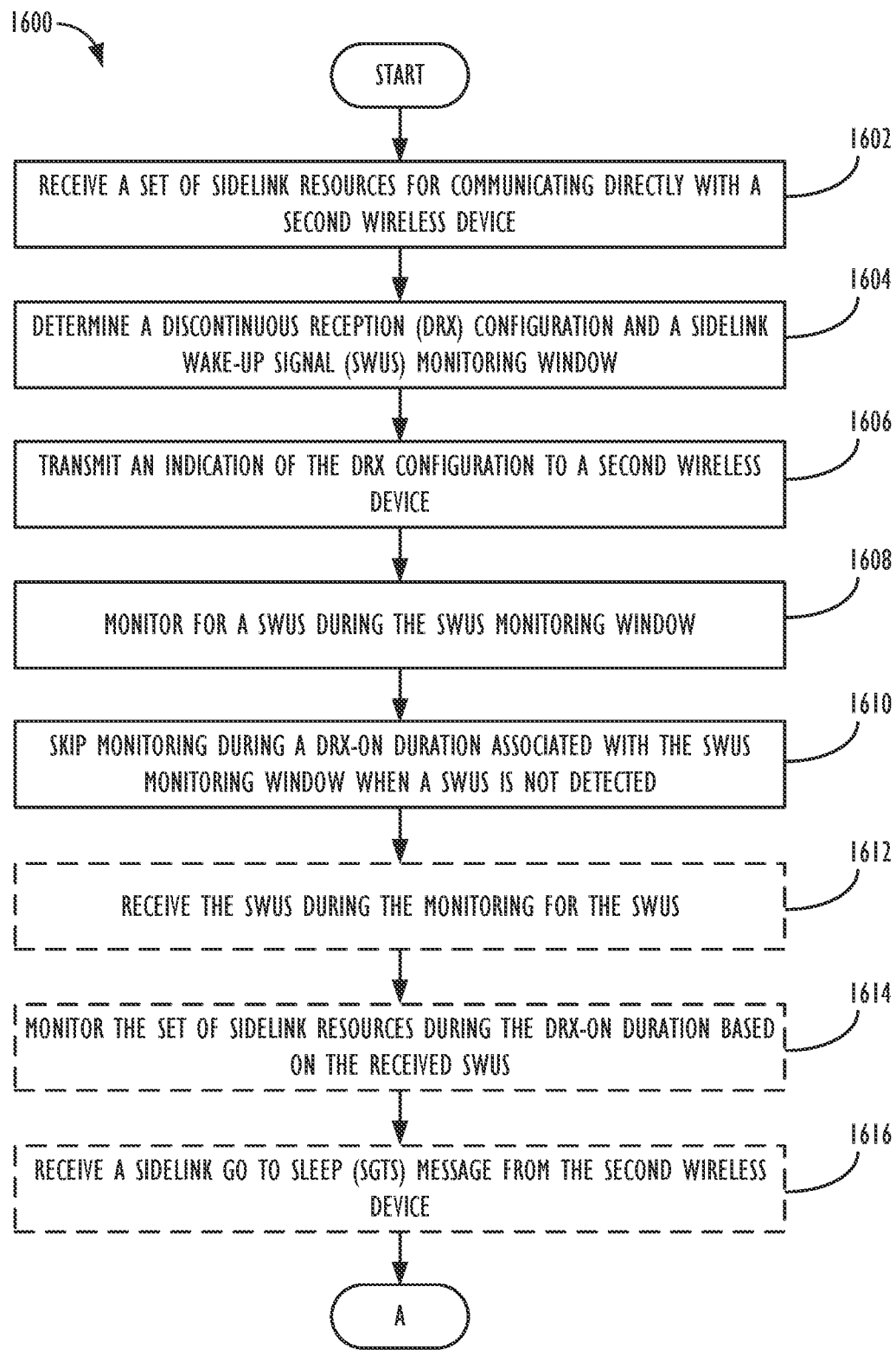
FIGS. 16A-16B are a flowchart illustrating a technique for SWUS, in accordance with aspects of the present disclosure.
Figure 16B:
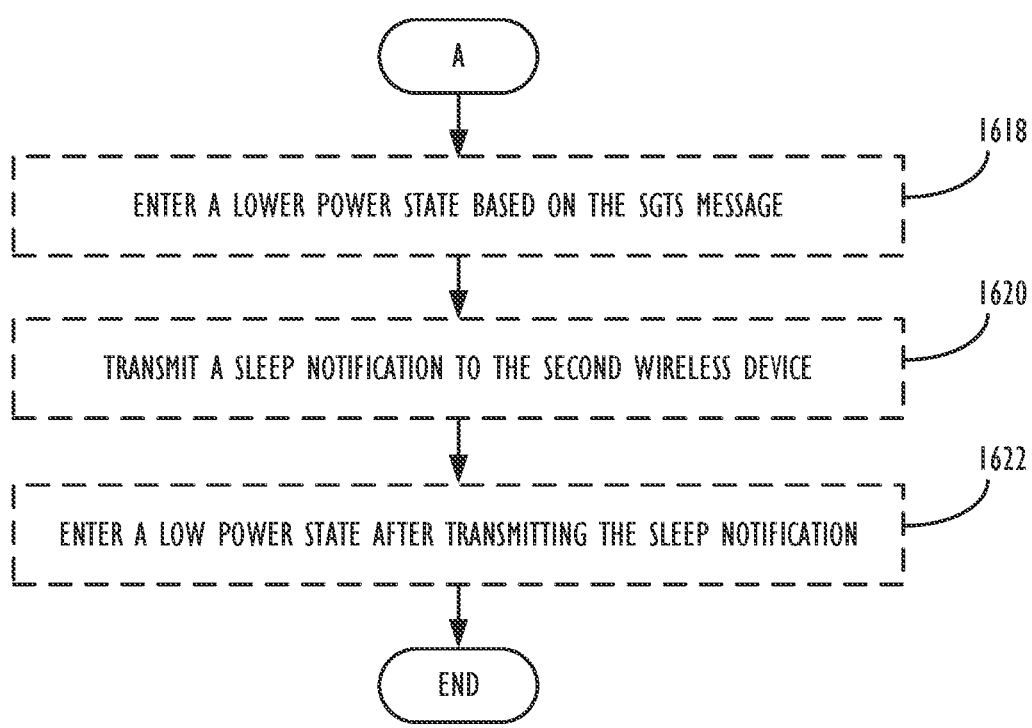

FIGS. 16A and 16B are a flowchart 1600 illustrating a technique for SWUS, in accordance with aspects of the present disclosure. At block 1602, a first wireless device receives a set of sidelink resources for communicating directly with a second wireless device. In some cases, the set of sidelink resources includes a SWUS resource configuration. At block 1604, a discontinuous reception (DRX) configuration and a sidelink wake-up signal (SWUS) monitoring window are determined. In some cases, the SWUS monitoring window is defined based on an offset and a minimum time gap between the SWUS monitoring window and the DRX monitoring window. In some cases, SW US resources are configured for a sidelink session between the first wireless device and the second wireless device. In some cases. SWUS resources are configured for a sidelink session based on a first identifier associated with the first wireless device and a second identifier associated with the second wireless device. In some cases, SWUS resources comprise one or more dedicated frequency resources. In some cases, the SWUS is frequency domain modulated with a physical sidelink feedback channel. In some cases, the SWUS shares resources with one of a sidelink scheduling request or sidelink paging.

At block 1606, an indication of the DRX configuration is transmitted to a second wireless device. In some cases, SWUS resources are configured for a sidelink session between the first wireless device and the second wireless device. This configuration information may be transmitted with the indication of the DRX configuration. At block 1608, the first wireless device monitors for a SWUS during the SWUS monitoring window. At block 1610, the first wireless device skips monitoring during a DRX-on duration associated with the SWUS monitoring window when a SWUS is not detected during the SWUS monitoring window. For example, if the first wireless device does not receive a SWUS during the SWUS monitoring window, the first wireless device may skip monitoring the sidelink resources pool during the next DRX-on duration associated with the SWUS monitoring window. A SWUS monitoring window may be associated with a DRX-on duration as the SWUS monitoring window may be defined based on the scheduled DRX-on duration.

Optionally at block 1612, the SWUS is received during the monitoring for the SWUS, and optionally at block 1614, the first wireless device monitors the set of sidelink resources during the DRX-on duration based on the received SWUS. For example, if the wireless device receives a SWUS during the SWUS monitoring window, the wireless device may enter a relatively higher power state and monitor the sidelink resources pool during the DRX-on duration.

Optionally, at block 1616, the first wireless device may receive a sidelink go to sleep (SGTS) message from the second wireless device and optionally, at block 1618, the first wireless device may enter a lower power state based on the SGTS message. In some case, the first wireless device may receive the SWUS during the monitoring for the SWUS, monitor the set of sidelink resources during the DRX-on duration based on the received SWUS, and receive sidelink data during the DRX monitoring window, wherein the SGTS message is received with the sidelink data. In some cases, the SGTS message is included in a sidelink control information (SCI) message. In some cases, the wireless device may transmit an acknowledgment message in response to the received SGTS message. In some cases, the set of sidelink resources includes resources for the SGTS. In some cases, SGTS resources are configured for a sidelink session between the first wireless device and the second wireless device. In some cases, SGTS resources are configured based on a first identifier associated with the first wireless device and a second identifier associated with the second wireless device. In some cases, the SGTS message is frequency domain modulated with a physical sidelink feedback channel.

Optionally, at block 1620, the first wireless device may transmit a sleep notification to the second wireless device. Optionally, at block 1622, the first wireless device may enter a low power state after transmitting the sleep notification. In some cases, the first wireless device may wait a predetermined time period before entering the low power state. In some cases, the first wireless device may enter a low power state based on an inactivity timer. In some cases, the inactivity timer is predetermined based on a power capability of the first wireless device. In some cases, the inactivity timer is predetermined based on a sidelink role of the first device in a sidelink session with the second device.

Figure 17:
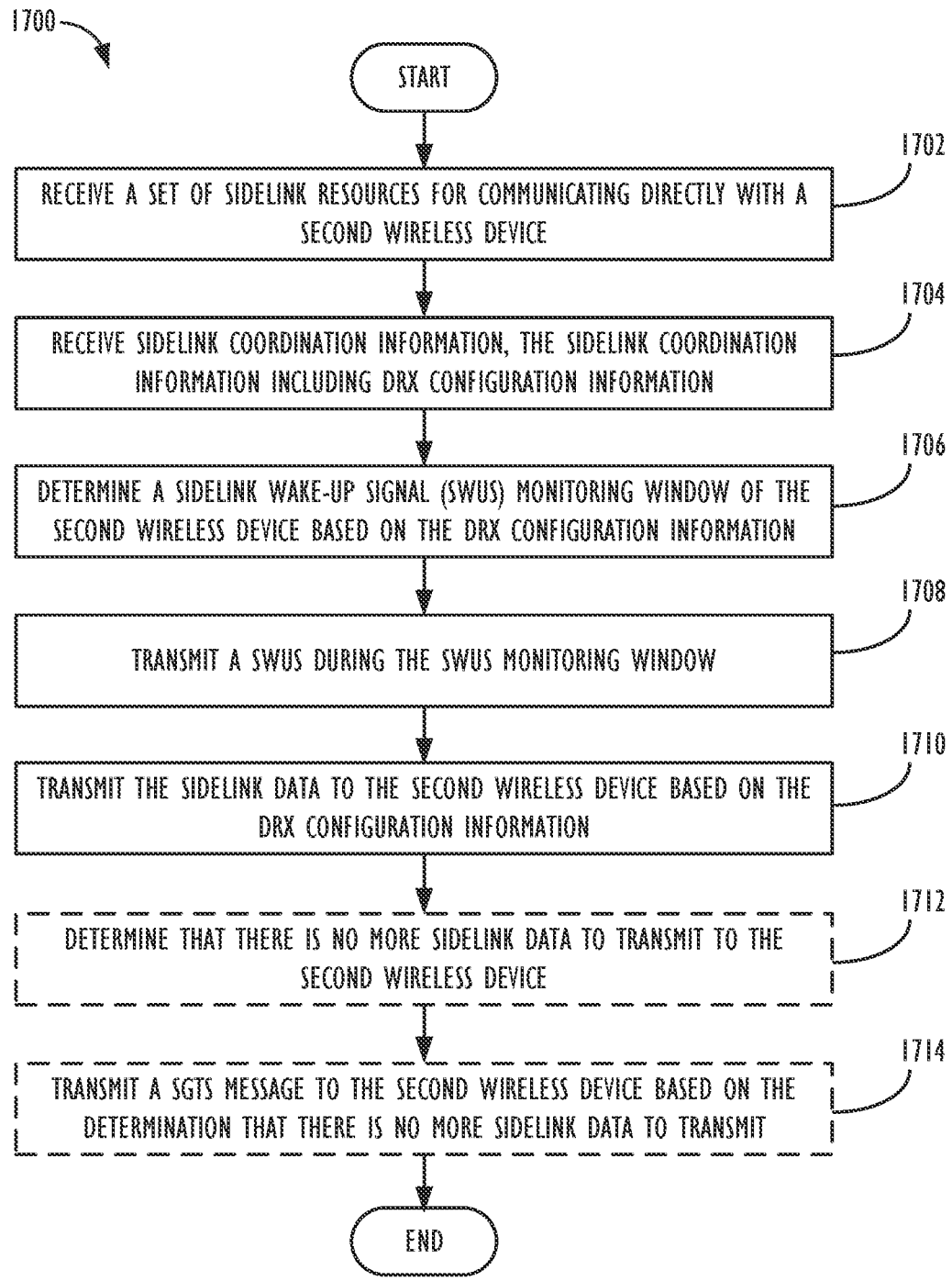
FIG. 17 is a flowchart illustrating a technique for SWUS, in accordance with aspects of the present disclosure.

FIG. 17 is a flowchart 1700 illustrating a technique for SWUS, in accordance with aspects of the present disclosure. At block 1702, a first wireless device receives a set of sidelink resources for communicating directly with a second wireless device. In some cases, the set of sidelink resources includes a SWUS resource configuration. At block 1704, sidelink coordination information is received, the sidelink coordination information including discontinuous reception (DRX) configuration information of the second wireless device.

At block 1706, a sidelink wake-up signal (SWUS) monitoring window of the second wireless device is determined based on the DRX configuration information. In some cases, the SWUS monitoring window is defined based on an offset and a minimum time gap between the SWUS monitoring window and the DRX monitoring window. In some cases, SWUS resources are configured for a sidelink session between the first wireless device and the second wireless device. In some cases, SWUS resources are configured for a sidelink session based on a first identifier associated with the first wireless device and a second identifier associated with the second wireless device. In some cases, SWUS resources comprise one or more dedicated frequency resources. In some cases, the SWUS is frequency domain modulated with a physical sidelink feedback channel. In some cases, the SWUS shares resources with one of a sidelink scheduling request or sidelink paging.

At block 1708, a SWUS is transmitted during the SWUS monitoring window. For example, if the first wireless device has sidelink data to transmit to the second wireless device, the first wireless device may transmit a SWUS during the SWUS monitoring window to indicate to the second wireless device to monitor the sidelink resources pool during the associated DRX-on duration. At block 1710, the sidelink data is transmitted to the second wireless device based on the DRX configuration information. For example, the sidelink data may be transmitted during the DRX-on duration of the second wireless device.

Optionally, at block 1712, the first wireless device determines that there is no more sidelink data to transmit to the second wireless device. Optionally, at block 1714, a sidelink go to sleep (SGTS) message is transmitted to the second wireless device based on the determination that there is no more sidelink data to transmit to the second wireless device. In some cases, the SGTS is transmitted with the sidelink data. In some cases, the SGTS message is included in a sidelink control information (SCI) message. In some cases, the first wireless device receives an acknowledgment message in response to the transmitted SGTS message. In some cases, the set of sidelink resources includes resources for the SGTS. In some cases, resources for the SGTS are configured for a sidelink session between the first wireless device and the second wireless device. In some cases, resources for the SGTS are configured based on a first identifier associated with the first wireless device and a second identifier associated with the second wireless device. In some cases, the SGTS message is frequency domain modulated with a physical sidelink feedback channel. In some cases, the first wireless device receives a sleep notification from the second wireless device.

EXAMPLES

In the following sections, further exemplary aspects are provided.

According to Example 1, a method for power saving for a wireless device, comprising: determining, by a first wireless device, a set of sidelink resources for communicating directly with a second wireless device; determining, by the first wireless device, a set of candidate sidelink resources for transmitting the sidelink data based on the received DRX configuration: determining, by the first wireless device, to transmit sidelink data to the second wireless device; receiving sidelink coordination information, the sidelink coordination information including discontinuous reception (DRX) configuration information of the second wireless device; selecting, from the set of candidate sidelink resources, a sidelink resource; and transmitting the sidelink data to the second wireless device on the selected sidelink resource.

Example 2 comprises the subject matter of example 1, wherein the DRX configuration information is received from the second wireless device.

Example 3 comprises the subject matter of example 1, wherein the DRX configuration information is received from a third wireless device.

Example 4 comprises the subject matter of any of examples 1-3, wherein determining the set of sidelink resources comprises: sensing at least a portion of the set of sidelink resources to determine a set of candidate sidelink resources; and adjusting the set of candidate sidelink resources based on the received DRX configuration.

Example 5 comprises the subject matter of example 4, wherein adjusting the set of candidate sidelink resources comprises adjusting a start time of the candidate sidelink resources based on a DRX-on duration start time indicated in the received DRX configuration of the second wireless device.

Example 6 comprises the subject matter of example 4, wherein adjusting the set of candidate sidelink resources comprises adjusting an end time of the candidate sidelink resources based on a DRX-on duration end time indicated in the received DRX configuration of the second wireless device.

Example 7 comprises the subject matter of example 4, wherein adjusting the set of candidate sidelink resources comprises: adjusting a start time of the candidate sidelink resources based on a DRX-on duration start time indicated in the received DRX configuration of the second wireless device; and adjusting an end time of the candidate sidelink resources based on a DRX-on duration end time indicated in the received DRX configuration of the second wireless device.

Example 8 comprises the subject matter of example 4, wherein adjusting the set of candidate sidelink resources comprises excluding candidate sidelink resources based on a comparison of the candidate sidelink resources in the set of candidate sidelink resources and a DRX-on duration time indicated in the received DRX configuration of the second wireless device.

Example 9 comprises the subject matter of example 1, wherein selecting a sidelink resource comprises selecting a sidelink resource based on a DRX-on duration time indicated in the received DRX configuration of the second wireless device.

Example 10 comprises the subject matter of example 1, further comprising: tracking a DRX status of the second wireless device; and transmitting a sidelink message to the second wireless device based on the tracked DRX status.

Example 11 comprises the subject matter of example 10, wherein tracking the DRX status of the second wireless device comprises: monitoring the set of sidelink resources for sidelink messages addressed to the second wireless device; and adjusting the tracked DRX status of the second wireless device based on a received sidelink message addressed to the second wireless device.

Example 12 comprises the subject matter of example 10, wherein tracking the DRX status of the second wireless device comprises: monitoring the set of sidelink resources for sidelink messages transmitted by the second wireless device; and adjusting the tracked DRX status of the second wireless device based on a received sidelink message transmitted by the second wireless device.

According to Example 13, a method for power saving for a wireless device, comprising: receiving, by a first wireless device, a set of sidelink resources for communicating directly with a second wireless device from a wireless node, receiving sidelink coordination information, the sidelink coordination information including discontinuous reception (DRX) configuration information of the second wireless device; determining, by the first wireless device, to transmit sidelink data to the second wireless device; transmitting a sidelink resources request to the wireless node, the sidelink resources request including assistance information based on the received sidelink coordination information; receiving a sidelink resources grant from the wireless node; and transmitting the sidelink data based on the sidelink resources grant.

Example 14 comprises the subject matter of example 13, wherein the assistance information comprises an identifier of the second wireless device.

Example 15 comprises the subject matter of example 13, wherein the assistance information comprises DRX configuration information.

Example 16 comprises the subject matter of example 13, wherein the assistance information comprises time restriction information based on the DRX configuration information.

Example 17 comprises the subject matter of example 13, wherein the DRX configuration information is received from the second wireless device.

Example 18 comprises the subject matter of example 13, wherein the DRX configuration information is received from a third wireless device.

According to Example 19, a method for power saving by a wireless device, comprising: receiving, by a first wireless device, a set of sidelink resources for communicating directly with a second wireless device; determining a discontinuous reception (DRX) configuration and a sidelink wake-up signal (SWUS) monitoring window; transmitting an indication of the DRX configuration to a second wireless device; monitoring for a SWUS during the SWUS monitoring window; and skipping monitoring during a DRX-on duration associated with the SWUS monitoring window when a SWUS is not detected during the SWUS monitoring window.

Example 20 comprises the subject matter of example 19, further comprising: receiving the SWUS during the monitoring for the SWUS; and monitoring the set of sidelink resources during the DRX-on duration based on the received SWUS.

Example 21 comprises the subject matter of example 19, wherein the SWUS monitoring window is defined based on an offset and a minimum time gap between the SWUS monitoring window and the DRX monitoring window.

Example 22 comprises the subject matter of any of examples 19-21, wherein the set of sidelink resources includes a SWUS resource configuration.

Example 23 comprises the subject matter of any of examples 19-21, wherein SWUS resources are configured for a sidelink session between the first wireless device and the second wireless device.

Example 24 comprises the subject matter of any of examples 19-21, wherein SWUS resources are configured for a sidelink session based on a first identifier associated with the first wireless device and a second identifier associated with the second wireless device.

Example 25 comprises the subject matter of any of examples 19-23, wherein SWUS resources comprise one or more dedicated frequency resources.

Example 26 comprises the subject matter of example 25, wherein the SWUS is frequency domain multiplexed with a physical sidelink feedback channel.

Example 27 comprises the subject matter of any of examples 19-26, wherein the SWUS shares resources with one of a sidelink scheduling request or sidelink paging.

Example 28 comprises the subject matter of example 19, further comprising: receiving a sidelink go to sleep (SGTS) message from the second wireless device; and entering a lower power state based on the SGTS message.

Example 29 comprises the subject matter of example 28, further comprising: receiving the SWUS during the monitoring for the SWUS; monitoring the set of sidelink resources during the DRX-on duration based on the received SWUS; and receiving sidelink data during the DRX monitoring window, wherein the SGTS message is received with the sidelink data.

Example 30 comprises the subject matter of example 28, wherein the SGTS message is included in a sidelink control information (SCI) message.

Example 31 comprises the subject matter of example 28, further comprising transmitting an acknowledgment message in response to the received SGTS message.

Example 32 comprises the subject matter of any of examples 28-31, wherein the set of sidelink resources includes resources for the SGTS.

Example 33 comprises the subject matter of any of examples 28-31, wherein SGTS resources are configured for a sidelink session between the first wireless device and the second wireless device.

Example 34 comprises the subject matter of any of examples 28-31, wherein SGTS resources are configured based on a first identifier associated with the first wireless device and a second identifier associated with the second wireless device.

Example 35 comprises the subject matter of any of examples 28-31, wherein the SGTS message is frequency domain multiplexed with a physical sidelink feedback channel.

Example 36 comprises the subject matter of example 19, further comprising: transmitting a sleep notification to the second wireless device; and entering a low power state after transmitting the sleep notification.

Example 37 comprises the subject matter of example 36, further comprising waiting a predetermined time period before entering the low power state.

Example 38 comprises the subject matter of example 19, further comprising entering a low power state based on an inactivity timer.

Example 39 comprises the subject matter of example 38, wherein the inactivity timer is predetermined based on a power capability of the first wireless device.

Example 40 comprises the subject matter of example 38, wherein the inactivity timer is predetermined based on a sidelink role of the first device in a sidelink session with the second device.

According to Example 41, a method for power saving by a wireless device, comprising: receiving, by a first wireless device, a set of sidelink resources for communicating directly with a second wireless device; receiving sidelink coordination information, the sidelink coordination information including discontinuous reception (DRX) configuration information of the second wireless device; determining a sidelink wake-up signal (SWUS) monitoring window of the second wireless device based on the DRX configuration information; transmitting a SWUS during the SWUS monitoring window; and transmitting the sidelink data to the second wireless device based on the DRX configuration information.

Example 42 comprises the subject matter of example 41, wherein the SWUS monitoring window is defined based on an offset and a minimum time gap between the SWUS monitoring window and the DRX monitoring window.

Example 43 comprises the subject matter of any of examples 4142, wherein the set of sidelink resources includes a SWUS resource configuration.

Example 44 comprises the subject matter of any of examples 4142, wherein SWUS resources are configured for a sidelink session between the first wireless device and the second wireless device.

Example 45 comprises the subject matter of any of examples 41-42, wherein SWUS resources are configured for a sidelink session based on a first identifier associated with the first wireless device and a second identifier associated with the second wireless device.

Example 46 comprises the subject matter of any of examples 41-45, wherein SWUS resources comprise one or more dedicated frequency resources.

Example 47 comprises the subject matter of example 46, wherein the SWUS is frequency domain multiplexed with a physical sidelink feedback channel.

Example 48 comprises the subject matter of any of examples 41-47, wherein the SWUS shares resources with one of a sidelink scheduling request or sidelink paging.

Example 49 comprises the subject matter of example 41, further comprising: determining that there is no more sidelink data to transmit to the second wireless device; and transmitting a sidelink go to sleep (SGTS) message to the second wireless device based on the determination that there is no more sidelink data to transmit to the second wireless device.

Example 50 comprises the subject matter of example 49, wherein the SGTS is transmitted with the sidelink data.

Example 51 comprises the subject matter of example 49, wherein the SGTS message is included in a sidelink control information (SCI) message.

Example 52 comprises the subject matter of example 49, further comprising receiving an acknowledgment message in response to the transmitted SGTS message.

Example 53 comprises the subject matter of any of examples 49-52, wherein the set of sidelink resources includes resources for the SGTS.

Example 54 comprises the subject matter of any of examples 49-52, wherein resources for the SGTS are configured for a sidelink session between the first wireless device and the second wireless device.

Example 55 comprises the subject matter of any of examples 49-52, wherein resources for the SGTS are configured based on a first identifier associated with the first wireless device and a second identifier associated with the second wireless device.

Example 56 comprises the subject matter of any of examples 49-52, wherein the SGTS message is frequency domain multiplexed with a physical sidelink feedback channel.

Example 57 comprises the subject matter of example 41, further comprising receiving a sleep notification from the second wireless device.

According to Example 58, a method that includes any action or combination of actions as substantially described herein in the Detailed Description.

According to Example 59, a method as substantially described herein with reference to each or any combination of the Figures included herein or with reference to each or any combination of paragraphs in the Detailed Description.

According to Example 60, a wireless device configured to perform any action or combination of actions as substantially described herein in the Detailed Description as included in the wireless device.

According to Example 61, a wireless station configured to perform any action or combination of actions as substantially described herein in the Detailed Description as included in the wireless station.

According to Example 62, a non-volatile computer-readable medium that stores instructions that, when executed, cause the performance of any action or combination of actions as substantially described herein in the Detailed Description.

According to Example 63, an integrated circuit configured to perform any action or combination of actions as substantially described herein in the Detailed Description.

Yet another exemplary aspect may include a method, comprising, by a device, performing any or all parts of the preceding Examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding Examples.

Yet another exemplary aspect may include an apparatus comprising means for performing any or all of the elements of any of the preceding Examples.

Still another exemplary aspect may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for power saving for a wireless device, comprising:
   determining, by a first wireless device, a set of sidelink resources for communicating directly with a second wireless device, wherein determining the set of sidelink resources comprises:
      sensing at least a portion of the set of sidelink resources to determine a set of candidate sidelink resources; and
      adjusting the set of candidate sidelink resources based on discontinuous reception (DRX) configuration information of the second wireless device, wherein adjusting the set of candidate sidelink resources comprises excluding candidate sidelink resources based on a comparison of the candidate sidelink resources in the set of candidate sidelink resources and a DRX-on duration time indicated in the DRX configuration information of the second wireless device;
   receiving sidelink coordination information, the sidelink coordination information including the DRX configuration information of the second wireless device;
   selecting, from the set of adjusted candidate sidelink resources, a sidelink resource; and
   transmitting sidelink data to the second wireless device on the selected sidelink resource.

2. The method of claim 1, wherein the DRX configuration information of the second wireless device is received from the second wireless device.

3. The method of claim 1, wherein the DRX configuration information of the second wireless device is received from a third wireless device.

4. The method of claim 1, wherein adjusting the set of candidate sidelink resources comprises adjusting a start time of the candidate sidelink resources based on a DRX-on duration start time indicated in the received DRX configuration of the second wireless device.

5. The method of claim 1, wherein adjusting the set of candidate sidelink resources comprises adjusting an end time of the candidate sidelink resources based on a DRX-on duration end time indicated in the received DRX configuration of the second wireless device.

6. The method of claim 1, wherein adjusting the set of candidate sidelink resources comprises:
   adjusting a start time of the candidate sidelink resources based on a DRX-on duration start time indicated in the received DRX configuration of the second wireless device; and
   adjusting an end time of the candidate sidelink resources based on a DRX-on duration end time indicated in the received DRX configuration of the second wireless device.

7. The method of claim 1, further comprising:
   tracking a DRX status of the second wireless device; and
   transmitting a sidelink message to the second wireless device based on the tracked DRX status.

8. The method of claim 7, wherein tracking the DRX status of the second wireless device comprises:
   monitoring the set of sidelink resources for sidelink messages addressed to the second wireless device; and
   adjusting the tracked DRX status of the second wireless device based on a received sidelink message addressed to the second wireless device.

9. The method of claim 7, wherein tracking the DRX status of the second wireless device comprises:
   monitoring the set of sidelink resources for sidelink messages transmitted by the second wireless device; and
   adjusting the tracked DRX status of the second wireless device based on a received sidelink message transmitted by the second wireless device.

10. A method for power saving for a wireless device, comprising:
    receiving, by a first wireless device, a set of sidelink resources for communicating directly with a second wireless device from a wireless node, wherein determining the set of sidelink resources comprises:
       sensing at least a portion of the set of sidelink resources to determine a set of candidate sidelink resources; and
       adjusting the set of candidate sidelink resources based on discontinuous reception (DRX) configuration information of the second wireless device, wherein adjusting the set of candidate sidelink resources comprises excluding candidate sidelink resources based on a comparison of the candidate sidelink resources in the set of candidate sidelink resources and a DRX-on duration time indicated in the DRX configuration information of the second wireless device;
    receiving sidelink coordination information, the sidelink coordination information including the DRX configuration information of the second wireless device;
    transmitting a sidelink resources request to the wireless node, the sidelink resources request including assistance information based on the received sidelink coordination information;
    receiving a sidelink resources grant from the wireless node; and
    transmitting sidelink data based on the sidelink resources grant.

11. The method of claim 10, wherein the assistance information comprises an identifier of the second wireless device.

12. The method of claim 10, wherein the assistance information comprises the DRX configuration information.

13. The method of claim 10, wherein the assistance information comprises time restriction information based on the DRX configuration information.

14. The method of claim 10, wherein the DRX configuration information of the second wireless device is received from the second wireless device.

15. The method of claim 10, wherein the DRX configuration information of the second wireless device is received from a third wireless device.

16. A wireless device comprising:
    an antenna;
    a radio operably coupled to the antenna; and
    a processor operably coupled to the radio, wherein the wireless device is configured to:
       determine a set of sidelink resources for communicating directly with a second wireless device, wherein determining the set of sidelink resources comprises:

sensing at least a portion of the set of sidelink resources to determine a set of candidate sidelink resources; and adjusting the set of candidate sidelink resources based on discontinuous reception (DRX) configuration information of the second wireless device, wherein adjusting the set of candidate sidelink resources comprises excluding candidate sidelink resources based on a comparison of the candidate sidelink resources in the set of candidate sidelink resources and a DRX-on duration time indicated in the DRX configuration information of the second wireless device;

receive sidelink coordination information, the sidelink coordination information including the DRX configuration information of the second wireless device;

select, from the set of candidate sidelink resources, a sidelink resource; and transmit sidelink data to the second wireless device on the selected sidelink resource.

* * * * *